(12) United States Patent
Park et al.

(10) Patent No.: US 11,228,411 B2
(45) Date of Patent: *Jan. 18, 2022

(54) MULTIUSER TRANSRECEIVING METHOD IN WIRELESS COMMUNICATION SYSTEM AND DEVICE FOR SAME

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

This patent is subject to a terminal disclaimer.

(21) Appl. No.: 16/842,639

(22) Filed: Apr. 7, 2020

(65) Prior Publication Data

US 2020/0235884 A1    Jul. 23, 2020

Related U.S. Application Data

(63) Continuation of application No. 16/224,634, filed on Dec. 18, 2018, now Pat. No. 10,652,000, which is a
(Continued)

(51) Int. Cl.
*H04L 5/00* (2006.01)
*H04L 27/26* (2006.01)
*H04W 84/12* (2009.01)

(52) U.S. Cl.
CPC .......... *H04L 5/0051* (2013.01); *H04L 5/0044* (2013.01); *H04L 5/0048* (2013.01); *H04L 27/26* (2013.01); *H04W 84/12* (2013.01)

(58) Field of Classification Search
CPC ... H04L 5/0051; H04L 5/0044; H04L 5/0048; H04L 27/26
(Continued)

(56) References Cited

U.S. PATENT DOCUMENTS 9,001,908 B2 * 4/2015 Zhang .................. H04L 5/0046
375/260
2005/0147025 A1   7/2005 Auer
(Continued)

FOREIGN PATENT DOCUMENTS

CN    1491011    4/2004
CN    1918818    2/2007
(Continued)

OTHER PUBLICATIONS

United States Patent and Trademark Office U.S. Appl. No. 16/224,634, Office Action dated Aug. 22, 2019, 25 pages.
(Continued)

*Primary Examiner* — Faisal Choudhury
(74) *Attorney, Agent, or Firm* — Lee, Hong, Degerman, Kang & Waimey PC

(57) ABSTRACT

A method for transmitting data from a station (STA) device in a wireless LAN (WLAN) system, according to one embodiment of the present invention, comprises the steps of: generating a physical protocol data unit (PPDU) including a physical preamble and a data field; and transmitting the PPDU, wherein when the data field is transmitted by using a 106-tone resource unit including first to fourth pilot tones, the positions of the first to the fourth pilot tones may be identical to the positions of four pilot tones from among eight pilot tones included in four 26-tone resource units, which are present at a position corresponding to the 106-tone resource unit, or identical to the positions of four pilot tones from among eight pilot tones included in two 52-tone
(Continued)

802.11 Components resource units, which are present at a position corresponding to the 106-tone resource unit.

14 Claims, 26 Drawing Sheets

Related U.S. Application Data continuation of application No. 15/523,275, filed as application No. PCT/KR2015/011645 on Nov. 2, 2015, now Pat. No. 10,200,175.

(60) Provisional application No. 62/175,440, filed on Jun. 15, 2015, provisional application No. 62/172,250, filed on Jun. 8, 2015, provisional application No. 62/163,349, filed on May 18, 2015, provisional application No. 62/137,236, filed on Mar. 24, 2015, provisional application No. 62/093,409, filed on Dec. 18, 2014, provisional application No. 62/090,371, filed on Dec. 11, 2014, provisional application No. 62/073,023, filed on Oct. 31, 2014.

(58) Field of Classification Search
USPC .......................................................... 370/338
See application file for complete search history.

(56) References Cited

U.S. PATENT DOCUMENTS

| | | | |
|---|---|---|---|
| 2009/0103666 | A1 | 4/2009 | Zhao et al. |
| 2011/0176626 | A1* | 7/2011 | Liao ...................... H04L 5/0023 375/260 |
| 2013/0107912 | A1 | 5/2013 | Ponnampalam |
| 2013/0170333 | A1 | 7/2013 | Yun et al. |
| 2013/0177090 | A1 | 7/2013 | Yang et al. |
| 2013/0229996 | A1 | 9/2013 | Wang et al. |
| 2013/0230120 | A1 | 9/2013 | Yang et al. |
| 2013/0266086 | A1 | 10/2013 | Yang et al. |
| 2014/0023156 | A1 | 1/2014 | Zhang et al. |
| 2014/0169357 | A1 | 6/2014 | Noh et al. |
| 2014/0286455 | A1 | 9/2014 | Choi et al. |
| 2015/0349995 | A1 | 12/2015 | Zhang et al. |
| 2016/0113009 | A1 | 4/2016 | Seok |
| 2016/0119047 | A1 | 4/2016 | Lee |
| 2016/0119452 | A1 | 4/2016 | Lee |
| 2016/0285600 | A1* | 9/2016 | Sun ...................... H04L 5/0091 |
| 2017/0338928 | A1 | 11/2017 | Park et al. |
| 2018/0062899 | A1* | 3/2018 | Zhang ................... H04L 1/0042 |
| 2019/0123877 | A1 | 4/2019 | Park et al. |

FOREIGN PATENT DOCUMENTS

| | | |
|---|---|---|
| CN | 102835061 | 12/2012 |
| CN | 103563283 | 2/2014 |
| CN | 103947143 | 7/2014 |
| EP | 0795853 | 9/1997 |
| EP | 2782274 | 9/2014 |
| JP | H08288905 | 11/1996 |
| JP | 2013501413 | 1/2013 |
| JP | 2014534716 | 12/2014 |
| KR | 20090077136 | 7/2009 |
| WO | 2011130473 | 10/2011 |
| WO | 2012002705 | 1/2012 |
| WO | 2012051319 | 4/2012 |
| WO | 2013122377 | 8/2013 |
| WO | 2014171788 | 10/2014 |

OTHER PUBLICATIONS

State Intellectual Property Office of the People's Republic of China Application Serial No. 201580058054.6, Office Action dated Sep. 5, 2019, 10 pages.
State Intellectual Property Office of the People's Republic of China Application Serial No. 201580058639.8, Office Action dated Sep. 2, 2019, 14 pages.
PCT International Application No. PCT/KR2015/011644, International Search Report dated Mar. 31, 2016, 3 pages.
European Patent Office Application Serial No. 15854444.5, Search Report dated May 16, 2018, 9 pages.
European Patent Office Application Serial No. 15854896.6, Search Report dated Jul. 5, 2018, 9 pages.
Japan Patent Office Application No. 2017-523397, Office Action dated Jun. 19, 2018, 3 pages.
Japan Patent Office Application No. 2017-523443, Office Action dated Jun. 26, 2018, 4 pages.
Ward, L., "White Paper", IEEE 802.11ax Technology Introduction, XP055477844, Oct. 2016, 34 pages.
Zhang, H. et al., "HE-LTF Proposal", doc.: IEEE 802.11-15/0349r2, Mar. 2015, 43 pages.
Waters, D. et al., "Signal and Pilot Definition for STBC Encoded MCS 32", IEEE P802.11 Wireless LANs, doc.: IEEE 802.11-06/0967r03, Jul. 2006, 6 pages.
Lee, D. et al., "Pilot Sequence design up to 8 Spatial Streams", doc.: IEEE 802.11-10/0786r0, Jul. 2010, 15 pages.
Azizi, S. et al., "OFDMA Numerology and Structure", doc.: IEEE 802.11-15/0330r5, XP068094351, May 2015, 50 pages.
Stacey, R. et al., "Specification Framework for TGac", IEEE P802.11 Wireless LANs, doc.: IEEE 802.11-09/0992r21, Jan. 2011, 50 pages.
PCT International Application No. PCT/KR2015/011645, Written Opinion of the International Searching Authority dated Mar. 31, 2016, 10 pages.
United States Patent and Trademark Office U.S. Appl. No. 15/523,226, Office Action dated Jan. 28, 2019, 18 pages.
European Patent Office Application Serial No. 15854444.5, Search Report dated Dec. 23, 2020, 11 pages.

* cited by examiner

[Fig. 1]
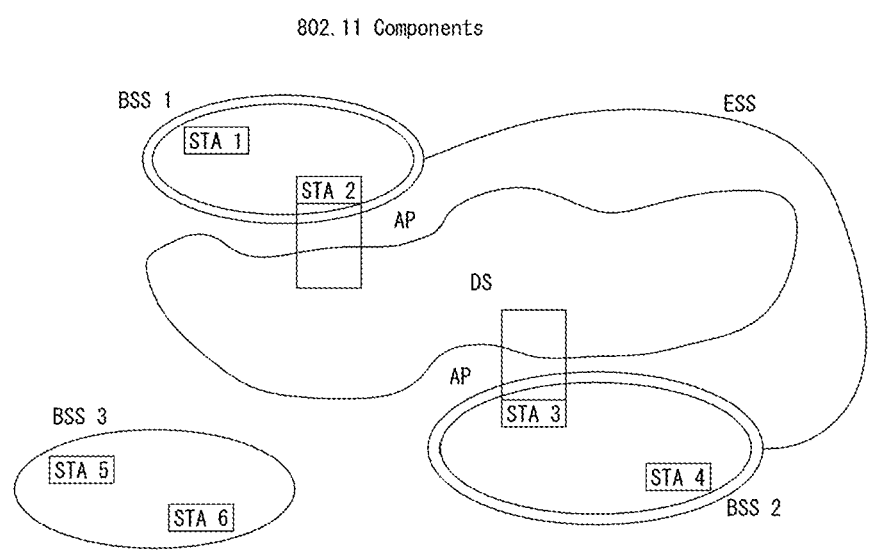

[Fig. 2]
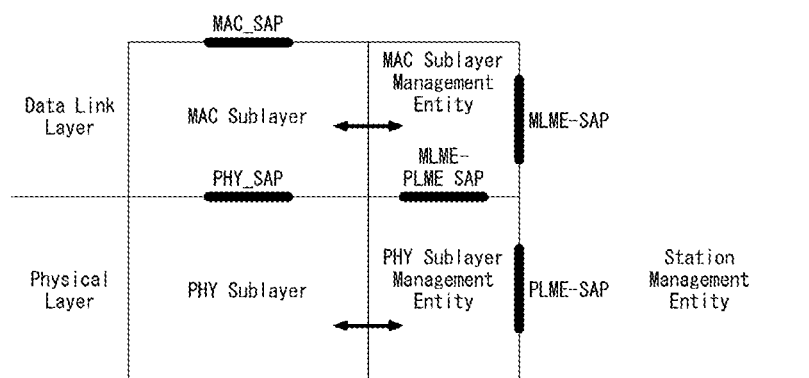

【Fig. 3】
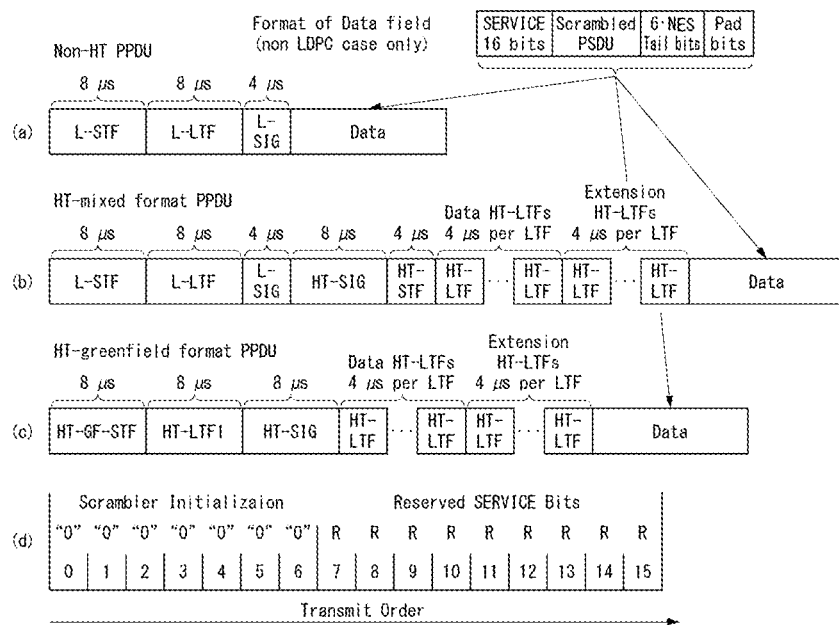
【Fig. 4】
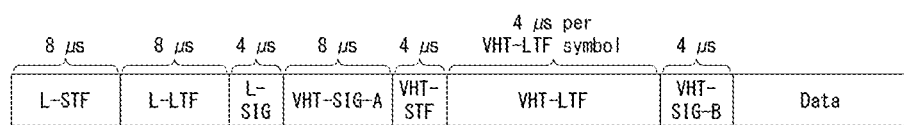

[Fig. 5]
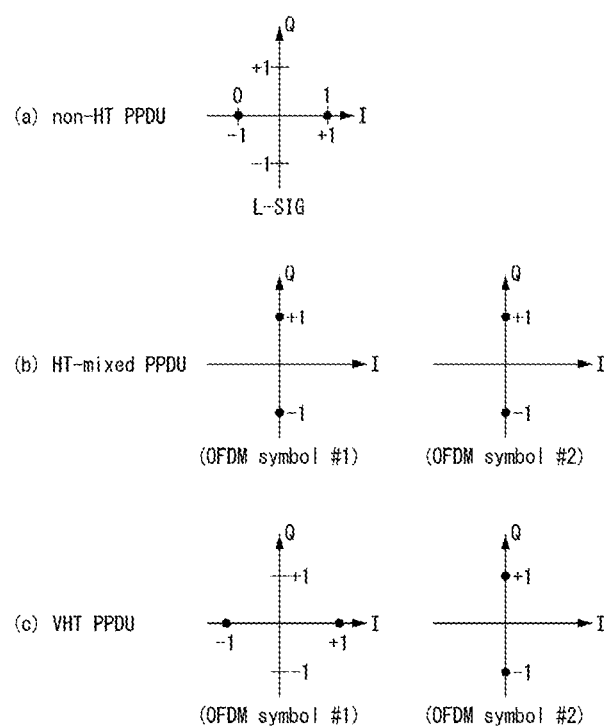

[Fig. 6]
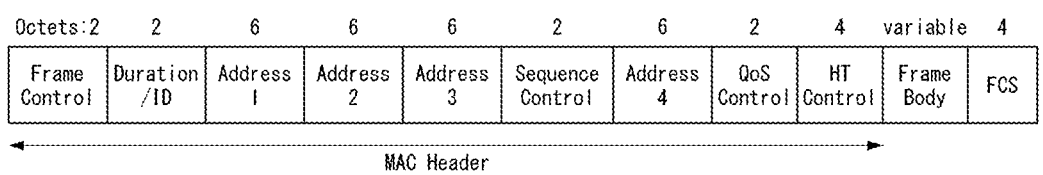

[Fig. 7]
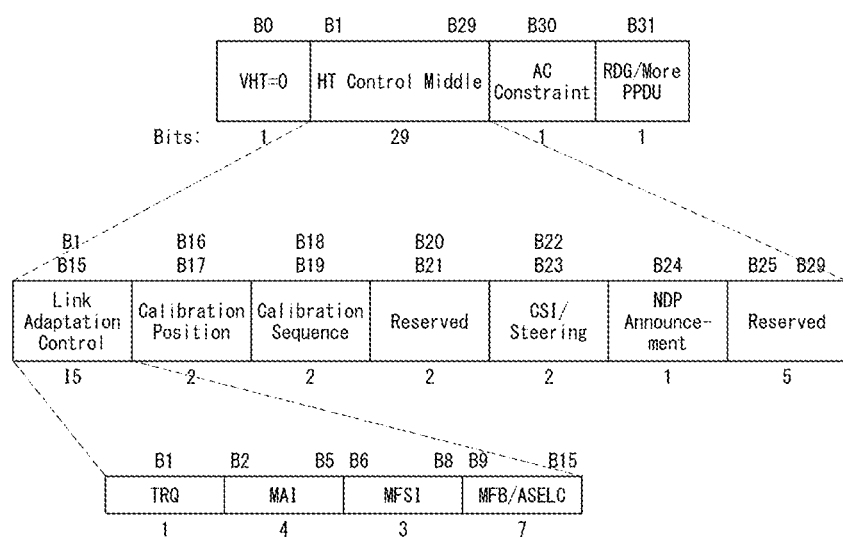

[Fig. 8]
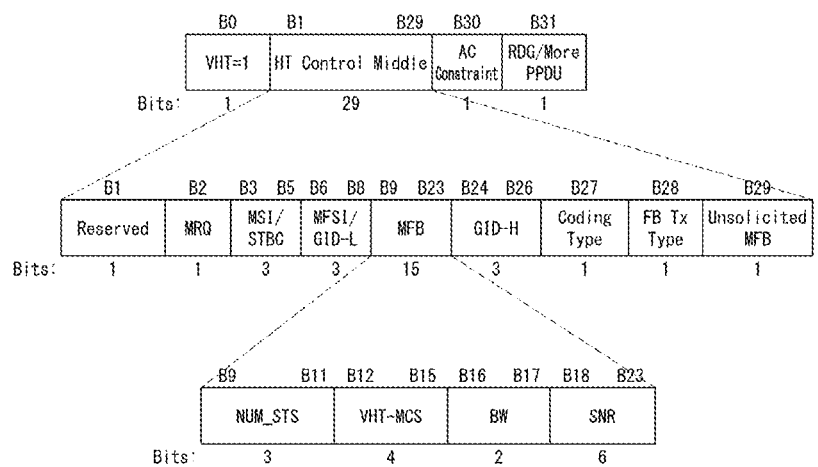

[Fig. 9]
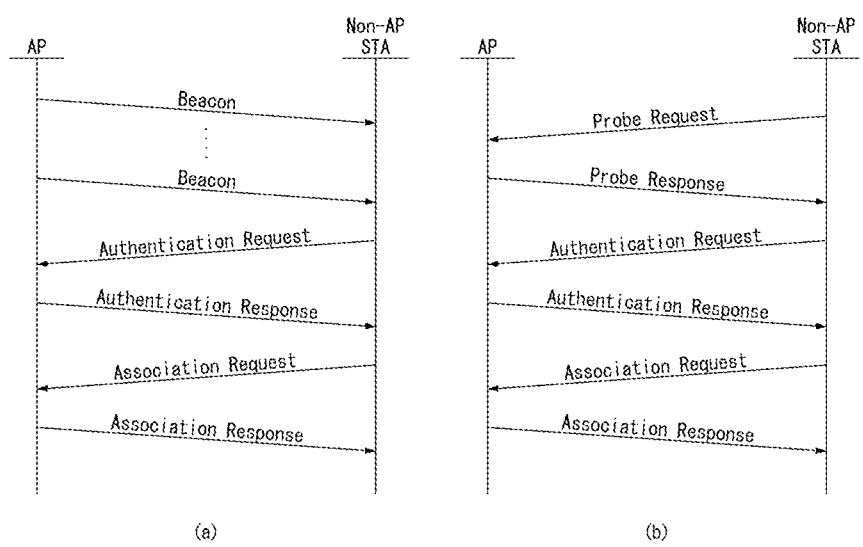

[Fig. 10]
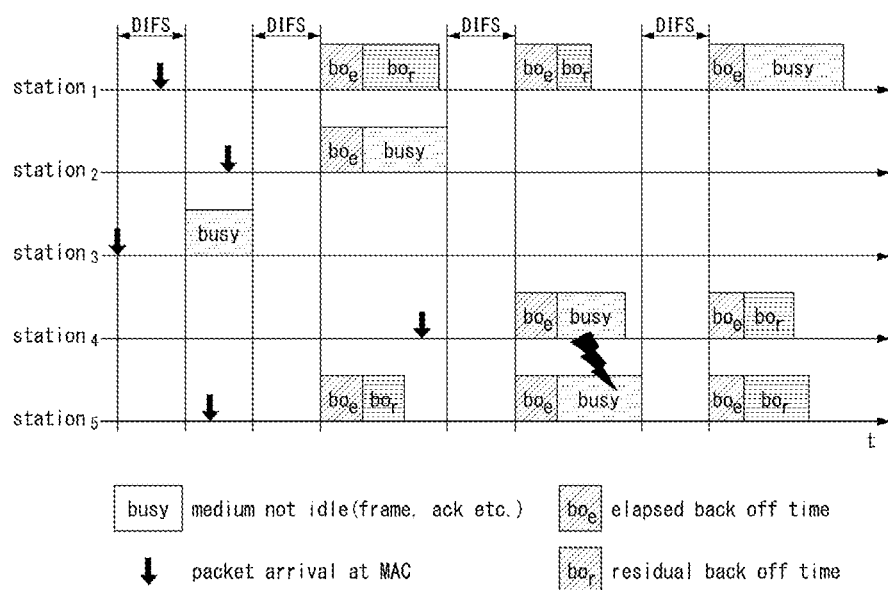

【Fig. 11】
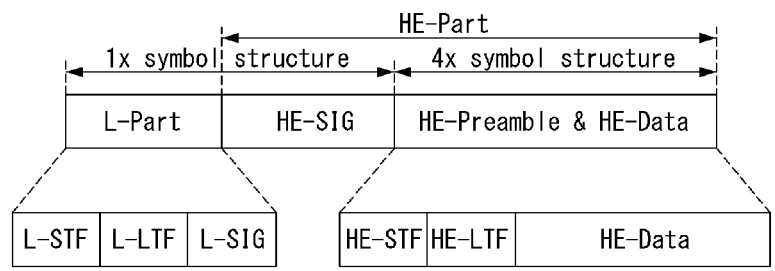
【Fig. 12】
| L-STF | L-LTF | L-SIG | HE-SIG A | HE-STF | HE-LTF | HE-SIG B | Data |
|---|---|---|---|---|---|---|---|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |
【Fig. 13】
| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 14]
| L-STF | L-LTF | L-SIG | HE-SIG A | HE-SIG B | HE-STF | HE-LTF | Data for STA1 |
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |
[Fig. 15]
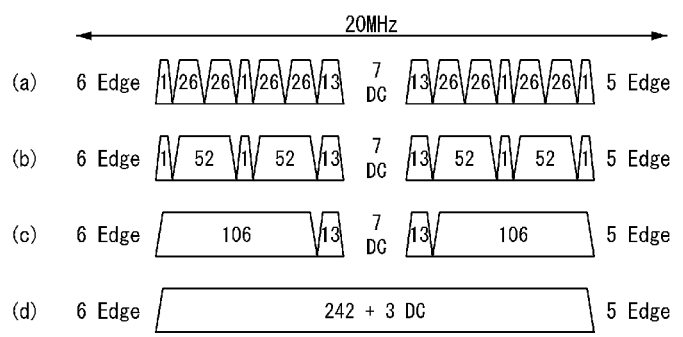

[Fig. 16]
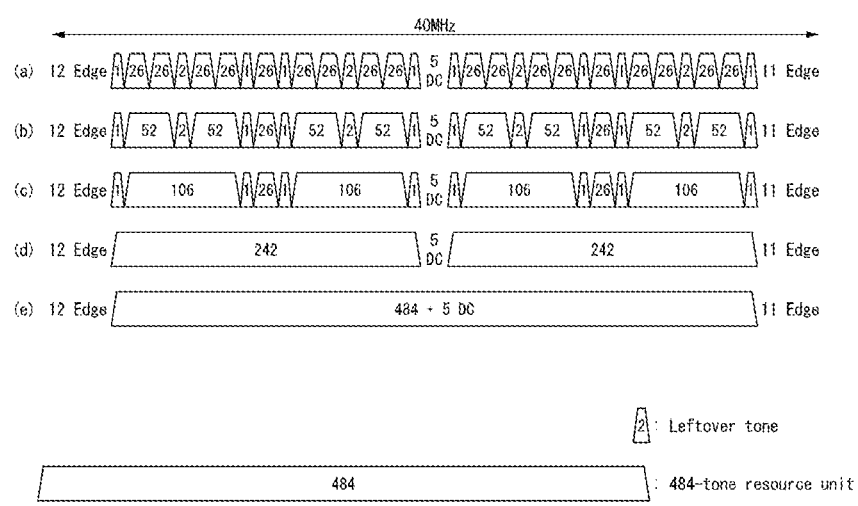

[Fig. 17]
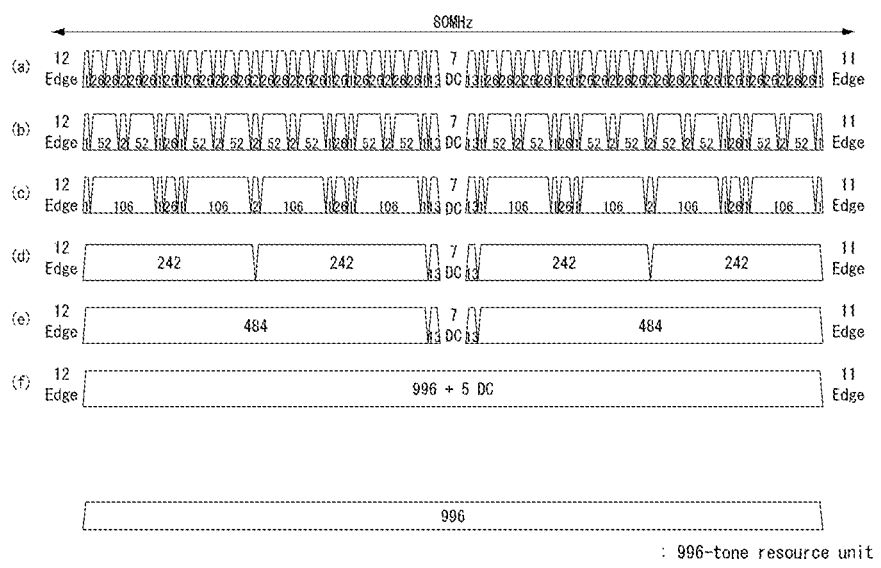

| $N_{STS}$ | $i_{STS}$ | $\psi^{(N_{STS})}_{i_{STS}0}$ | $\psi^{(N_{STS})}_{i_{STS}1}$ | $\psi^{(N_{STS})}_{i_{STS}2}$ | $\psi^{(N_{STS})}_{i_{STS}3}$ |
|---|---|---|---|---|---|
| 1 | 1 | 1 | 1 | 1 | -1 |
| 2 | 1 | 1 | 1 | -1 | -1 |
| 2 | 2 | 1 | -1 | -1 | 1 |
| 3 | 1 | 1 | 1 | -1 | -1 |
| 3 | 2 | 1 | -1 | 1 | -1 |
| 3 | 3 | -1 | 1 | 1 | -1 |
| 4 | 1 | 1 | 1 | 1 | -1 |
| 4 | 2 | 1 | 1 | -1 | 1 |
| 4 | 3 | 1 | -1 | 1 | 1 |
| 4 | 4 | -1 | 1 | 1 | 1 |

(b)

| $N_{STS}$ | $i_{STS}$ | $\psi^{(N_{STS})}_{i_{STS}0}$ | $\psi^{(N_{STS})}_{i_{STS}1}$ | $\psi^{(N_{STS})}_{i_{STS}2}$ | $\psi^{(N_{STS})}_{i_{STS}3}$ | $\psi^{(N_{STS})}_{i_{STS}4}$ | $\psi^{(N_{STS})}_{i_{STS}5}$ |
|---|---|---|---|---|---|---|---|
| 1 | 1 | 1 | 1 | 1 | -1 | -1 | 1 |
| 2 | 1 | 1 | 1 | -1 | -1 | -1 | -1 |
| 2 | 2 | 1 | 1 | 1 | -1 | 1 | 1 |
| 3 | 1 | 1 | 1 | -1 | -1 | -1 | -1 |
| 3 | 2 | 1 | 1 | 1 | -1 | 1 | 1 |
| 3 | 3 | 1 | -1 | 1 | -1 | -1 | 1 |
| 4 | 1 | 1 | 1 | -1 | -1 | -1 | -1 |
| 4 | 2 | 1 | 1 | 1 | -1 | 1 | 1 |
| 4 | 3 | 1 | -1 | 1 | -1 | -1 | 1 |
| 4 | 4 | -1 | 1 | 1 | 1 | -1 | 1 |

(c)

| $\psi_0$ | $\psi_1$ | $\psi_2$ | $\psi_3$ | $\psi_4$ | $\psi_5$ | $\psi_6$ | $\psi_7$ |
|---|---|---|---|---|---|---|---|
| 1 | 1 | 1 | -1 | -1 | 1 | 1 | 1 |

【Fig. 19】

(a) $N_{STS} = 1$

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 1 | 1 | 1 | −1 | −1 | 1 | 1 | 1 |

(b) $N_{STS} = 2$

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 1 | 1 | −1 | −1 | −1 | −1 | 1 | 1 |
| 2 | 1 | −1 | −1 | 1 | 1 | −1 | −1 | 1 |

(c) $N_{STS} = 3$

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 1 | 1 | −1 | −1 | −1 | −1 | 1 | 1 |
| 2 | 1 | −1 | 1 | −1 | −1 | 1 | −1 | 1 |
| 3 | −1 | 1 | 1 | −1 | −1 | 1 | 1 | −1 |

[Fig. 20]

(a) $N_{STS} = 4$

| $i_{STS}$ | $\Psi^{NSTS,8}_{iSTS,0}$ | $\Psi^{NSTS,8}_{iSTS,1}$ | $\Psi^{NSTS,8}_{iSTS,2}$ | $\Psi^{NSTS,8}_{iSTS,3}$ | $\Psi^{NSTS,8}_{iSTS,4}$ | $\Psi^{NSTS,8}_{iSTS,5}$ | $\Psi^{NSTS,8}_{iSTS,6}$ | $\Psi^{NSTS,8}_{iSTS,7}$ |
|---|---|---|---|---|---|---|---|---|
| 1 | 1 | 1 | 1 | -1 | -1 | 1 | 1 | 1 |
| 2 | 1 | 1 | -1 | 1 | 1 | -1 | 1 | 1 |
| 3 | 1 | -1 | 1 | 1 | 1 | 1 | -1 | 1 |
| 4 | -1 | 1 | 1 | 1 | 1 | 1 | 1 | -1 |

(b) $N_{STS} = 5$

| $i_{STS}$ | $\Psi^{NSTS,8}_{iSTS,0}$ | $\Psi^{NSTS,8}_{iSTS,1}$ | $\Psi^{NSTS,8}_{iSTS,2}$ | $\Psi^{NSTS,8}_{iSTS,3}$ | $\Psi^{NSTS,8}_{iSTS,4}$ | $\Psi^{NSTS,8}_{iSTS,5}$ | $\Psi^{NSTS,8}_{iSTS,6}$ | $\Psi^{NSTS,8}_{iSTS,7}$ |
|---|---|---|---|---|---|---|---|---|
| 1 | 1 | 1 | 1 | -1 | -1 | 1 | 1 | 1 |
| 2 | 1 | 1 | -1 | 1 | 1 | -1 | 1 | 1 |
| 3 | 1 | -1 | 1 | 1 | 1 | 1 | -1 | 1 |
| 4 | -1 | 1 | 1 | 1 | 1 | 1 | 1 | -1 |
| 5 | 1 | 1 | 1 | -1 | 1 | -1 | -1 | -1 |

【Fig. 21】

(a) $N_{STS} = 6$

| $i_{STS}$ | $\psi^{N_{STS},8}_{i_{STS},0}$ | $\psi^{N_{STS},8}_{i_{STS},1}$ | $\psi^{N_{STS},8}_{i_{STS},2}$ | $\psi^{N_{STS},8}_{i_{STS},3}$ | $\psi^{N_{STS},8}_{i_{STS},4}$ | $\psi^{N_{STS},8}_{i_{STS},5}$ | $\psi^{N_{STS},8}_{i_{STS},6}$ | $\psi^{N_{STS},8}_{i_{STS},7}$ |
|---|---|---|---|---|---|---|---|---|
| 1 | 1 | 1 | 1 | −1 | −1 | 1 | 1 | 1 |
| 2 | 1 | 1 | −1 | 1 | 1 | −1 | 1 | 1 |
| 3 | 1 | −1 | 1 | 1 | 1 | 1 | −1 | 1 |
| 4 | −1 | 1 | 1 | 1 | 1 | 1 | 1 | −1 |
| 5 | 1 | 1 | 1 | −1 | 1 | −1 | −1 | −1 |
| 6 | 1 | 1 | −1 | 1 | −1 | 1 | −1 | −1 |

(b) $N_{STS} = 7$

| $i_{STS}$ | $\psi^{N_{STS},8}_{i_{STS},0}$ | $\psi^{N_{STS},8}_{i_{STS},1}$ | $\psi^{N_{STS},8}_{i_{STS},2}$ | $\psi^{N_{STS},8}_{i_{STS},3}$ | $\psi^{N_{STS},8}_{i_{STS},4}$ | $\psi^{N_{STS},8}_{i_{STS},5}$ | $\psi^{N_{STS},8}_{i_{STS},6}$ | $\psi^{N_{STS},8}_{i_{STS},7}$ |
|---|---|---|---|---|---|---|---|---|
| 1 | 1 | 1 | 1 | −1 | −1 | 1 | 1 | 1 |
| 2 | 1 | 1 | −1 | 1 | 1 | −1 | 1 | 1 |
| 3 | 1 | −1 | 1 | 1 | 1 | 1 | −1 | 1 |
| 4 | −1 | 1 | 1 | 1 | 1 | 1 | 1 | −1 |
| 5 | 1 | 1 | 1 | −1 | 1 | −1 | −1 | −1 |
| 6 | 1 | 1 | −1 | 1 | −1 | 1 | −1 | −1 |
| 7 | 1 | −1 | 1 | 1 | −1 | −1 | 1 | −1 |

【Fig. 22】

$N_{STS} = 8$

| $i_{STS}$ | $\psi^{N_{STS},8}_{i_{STS},0}$ | $\psi^{N_{STS},8}_{i_{STS},1}$ | $\psi^{N_{STS},8}_{i_{STS},2}$ | $\psi^{N_{STS},8}_{i_{STS},3}$ | $\psi^{N_{STS},8}_{i_{STS},4}$ | $\psi^{N_{STS},8}_{i_{STS},5}$ | $\psi^{N_{STS},8}_{i_{STS},6}$ | $\psi^{N_{STS},8}_{i_{STS},7}$ |
|---|---|---|---|---|---|---|---|---|
| 1 | 1 | 1 | 1 | -1 | -1 | 1 | 1 | 1 |
| 2 | 1 | 1 | -1 | 1 | 1 | -1 | 1 | 1 |
| 3 | 1 | -1 | 1 | 1 | 1 | 1 | -1 | 1 |
| 4 | -1 | 1 | 1 | 1 | 1 | 1 | 1 | -1 |
| 5 | 1 | 1 | 1 | -1 | 1 | -1 | -1 | -1 |
| 6 | 1 | 1 | -1 | 1 | -1 | 1 | -1 | -1 |
| 7 | 1 | -1 | 1 | 1 | -1 | -1 | 1 | -1 |
| 8 | -1 | 1 | 1 | 1 | -1 | -1 | -1 | 1 |

【Fig. 23】

| index | A group | B group | C group |
|---|---|---|---|
| 1 | {1 1 1 -1} | {1 1 1 1} | {-1 -1 -1 -1} |
| 2 | {1 1 -1 1} | {1 1 -1 -1} | {-1 -1 1 1} |
| 3 | {1 -1 1 1} | {1 -1 -1 1} | {-1 1 1 -1} |
| 4 | {-1 1 1 1} | {1 -1 1 -1} | {-1 1 -1 1} |

【Fig. 24】

$N_{STS} = 1$ (a)

| $i_{STS}$ | $\psi^{NSTS, 2}_{iSTS, 0}$ | $\psi^{NSTS, 2}_{iSTS, 1}$ |
|---|---|---|
| 1 | −1 | 1 |

(b)

| $i_{STS}$ | $\psi^{NSTS, 2}_{iSTS, 0}$ | $\psi^{NSTS, 2}_{iSTS, 1}$ |
|---|---|---|
| 1 | 1 | −1 |

[Fig. 25]

$N_{STS} = 2$ (a)

| $i_{STS}$ | $\Psi^{NSTS,2}_{iSTS,0}$ | $\Psi^{NSTS,2}_{iSTS,1}$ |
|---|---|---|
| i | −1 | 1 |
| $i^c$ | 1 | 1 |

(b)

| $i_{STS}$ | $\Psi^{NSTS,2}_{iSTS,0}$ | $\Psi^{NSTS,2}_{iSTS,1}$ |
|---|---|---|
| i | 1 | −1 |
| $i^c$ | 1 | 1 |

(c)

| $i_{STS}$ | $\Psi^{NSTS,2}_{iSTS,0}$ | $\Psi^{NSTS,2}_{iSTS,1}$ |
|---|---|---|
| i | −1 | 1 |
| $i^c$ | 1 | −1 |

【Fig. 26】

$N_{STS} = 1$

| $i_{STS}$ | $\Psi^{NSTS,4}_{iSTS,0}$ | $\Psi^{NSTS,4}_{iSTS,1}$ | $\Psi^{NSTS,4}_{iSTS,2}$ | $\Psi^{NSTS,4}_{iSTS,3}$ |
|---|---|---|---|---|
| 1 | 1 | 1 | 1 | −1 |

$N_{STS} = 2$

| $i_{STS}$ | $\Psi^{NSTS,4}_{iSTS,0}$ | $\Psi^{NSTS,4}_{iSTS,1}$ | $\Psi^{NSTS,4}_{iSTS,2}$ | $\Psi^{NSTS,4}_{iSTS,3}$ |
|---|---|---|---|---|
| 1 | 1 | 1 | −1 | −1 |
| 2 | 1 | −1 | −1 | 1 |

$N_{STS} = 3$

| $i_{STS}$ | $\Psi^{NSTS,4}_{iSTS,0}$ | $\Psi^{NSTS,4}_{iSTS,1}$ | $\Psi^{NSTS,4}_{iSTS,2}$ | $\Psi^{NSTS,4}_{iSTS,3}$ |
|---|---|---|---|---|
| 1 | 1 | 1 | −1 | −1 |
| 2 | 1 | −1 | 1 | −1 |
| 3 | −1 | 1 | 1 | −1 |

【Fig. 27】

$N_{STS} = 4$

| $i_{STS}$ | $\Psi^{NSTS,4}_{iSTS,0}$ | $\Psi^{NSTS,4}_{iSTS,1}$ | $\Psi^{NSTS,4}_{iSTS,2}$ | $\Psi^{NSTS,4}_{iSTS,3}$ |
|---|---|---|---|---|
| 1 | 1 | 1 | 1 | −1 |
| 2 | 1 | 1 | −1 | 1 |
| 3 | 1 | −1 | 1 | 1 |
| 4 | −1 | 1 | 1 | 1 |

[Fig. 28]

| index | A group | B group |
|---|---|---|
| 1 | {1 1} | {-1 -1} |
| 2 | {1 -1} | {1 -1} |
| 3 | {-1 1} | {-1 1} |

【Fig. 29】

$N_{STS} = 1$

| $i_{STS}$ | $\psi^{NSTS,6}_{iSTS,0}$ | $\psi^{NSTS,6}_{iSTS,1}$ | $\psi^{NSTS,6}_{iSTS,2}$ | $\psi^{NSTS,6}_{iSTS,3}$ | $\psi^{NSTS,6}_{iSTS,4}$ | $\psi^{NSTS,6}_{iSTS,5}$ |
|---|---|---|---|---|---|---|
| 1 | 1 | 1 | 1 | −1 | −1 | 1 |

$N_{STS} = 2$

| $i_{STS}$ | $\psi^{NSTS,6}_{iSTS,0}$ | $\psi^{NSTS,6}_{iSTS,1}$ | $\psi^{NSTS,6}_{iSTS,2}$ | $\psi^{NSTS,6}_{iSTS,3}$ | $\psi^{NSTS,6}_{iSTS,4}$ | $\psi^{NSTS,6}_{iSTS,5}$ |
|---|---|---|---|---|---|---|
| 1 | 1 | 1 | −1 | −1 | −1 | −1 |
| 2 | 1 | 1 | 1 | −1 | 1 | 1 |

$N_{STS} = 3$

| $i_{STS}$ | $\psi^{NSTS,6}_{iSTS,0}$ | $\psi^{NSTS,6}_{iSTS,1}$ | $\psi^{NSTS,6}_{iSTS,2}$ | $\psi^{NSTS,6}_{iSTS,3}$ | $\psi^{NSTS,6}_{iSTS,4}$ | $\psi^{NSTS,6}_{iSTS,5}$ |
|---|---|---|---|---|---|---|
| 1 | 1 | 1 | −1 | −1 | −1 | −1 |
| 2 | 1 | 1 | 1 | −1 | 1 | 1 |
| 3 | 1 | −1 | 1 | −1 | −1 | 1 |

【Fig. 30】

$N_{STS} = 4$

| $i_{STS}$ | $\psi^{NSTS,6}_{iSTS,0}$ | $\psi^{NSTS,6}_{iSTS,1}$ | $\psi^{NSTS,6}_{iSTS,2}$ | $\psi^{NSTS,6}_{iSTS,3}$ | $\psi^{NSTS,6}_{iSTS,4}$ | $\psi^{NSTS,6}_{iSTS,5}$ |
|---|---|---|---|---|---|---|
| 1 | 1 | 1 | −1 | −1 | −1 | −1 |
| 2 | 1 | 1 | 1 | −1 | 1 | 1 |
| 3 | 1 | −1 | 1 | −1 | −1 | 1 |
| 4 | −1 | 1 | 1 | 1 | −1 | 1 |

【Fig. 31】
| index | A Group | B Group | C Group |
|-------|---------|---------|---------|
| 1 | {1  1} | {1  1} | {1  1} |
| 2 | {-1 -1} | {-1 -1} | {-1 -1} |
| 3 | {1 -1} | {1 -1} | {1 -1} |
| 4 | {-1 1} | {-1 1} | {-1 1} |
【Fig. 32】
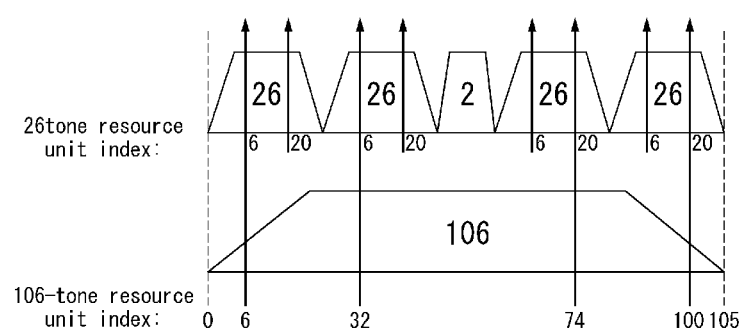

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 0 | 1 | 0 | 0 | -1 | 0 | 0 | 0 |
| 2 | 1 | 0 | -1 | 1 | 0 | -1 | -1 | 1 |

(b)

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 1 | 1 | -1 | -1 | 0 | 0 | 0 | 0 |
| 2 | 0 | 0 | 0 | 0 | 1 | -1 | -1 | 1 |

(c)

| $i_{STS}$ | $\psi^{NSTS,8}_{iSTS,0}$ | $\psi^{NSTS,8}_{iSTS,1}$ | $\psi^{NSTS,8}_{iSTS,2}$ | $\psi^{NSTS,8}_{iSTS,3}$ | $\psi^{NSTS,8}_{iSTS,4}$ | $\psi^{NSTS,8}_{iSTS,5}$ | $\psi^{NSTS,8}_{iSTS,6}$ | $\psi^{NSTS,8}_{iSTS,7}$ |
|---|---|---|---|---|---|---|---|---|
| 1 | 1 | 1 | 0 | 0 | 0 | 0 | 0 | 0 |
| 2 | 0 | 0 | -1 | 1 | 1 | -1 | -1 | 1 |

【Fig. 34】

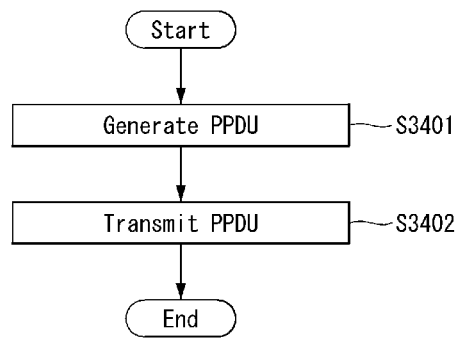

[Fig. 35]
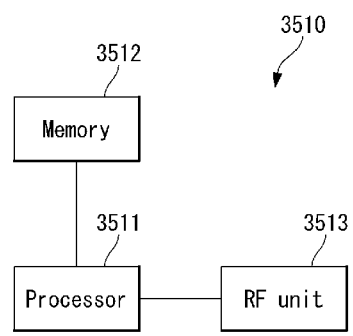

MULTIUSER TRANSRECEIVING METHOD IN WIRELESS COMMUNICATION SYSTEM AND DEVICE FOR SAME

CROSS-REFERENCE TO RELATED APPLICATIONS

This application is a continuation of U.S. patent application Ser. No. 16/224,634, filed on Dec. 18, 2018, now U.S. Pat. No. 10,652,000, which is a continuation of Ser. No. 15/523,275, filed on Apr. 28, 2017, now U.S. Pat. No. 10,200,175, which is a National Stage filing under 35 U.S.C. 371 of International Application No. PCT/KR2015/011645, filed on Nov. 2, 2015, which claims the benefit of U.S. Provisional Application No. 62/073,023, filed on Oct. 31, 2014, 62/090,371, filed on Dec. 11, 2014, 62/093,409, filed on Dec. 18, 2014, 62/137,236, filed on Mar. 24, 2015, 62/163,349, filed on May 18, 2015, 62/172,250, filed on Jun. 8, 2015, and 62/175,440, filed on Jun. 15, 2015, the contents of which are all hereby incorporated by reference herein in their entirety.

TECHNICAL FIELD

The present invention relates to a wireless communication system and, more specifically, proposes an efficient tone plan applicable to a new frame and numerology of a future wireless LAN system.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

When an FFT size quadruple that of the legacy WLAN system is used in an 802.11ax system, it is difficult to apply pilot deployment of an 802.11ac system. Accordingly, the present invention supplements and extends the tone plan proposed in 802.11n and 802.11ac systems to propose an efficient pilot design method suitable for numerology of an 802.11ax system.

Technical Solution

A data transmission method of a station (STA) in a wireless LAN (WLAN) system according to an embodiment of the present invention includes: generating a physical protocol data unit (PPDU) including a physical preamble and a data field; and transmitting the PPDU, wherein, when the data field is transmitted using a 106-tone resource unit including first to fourth pilot tones, positions of the first to fourth pilot tones correspond to positions of 4 pilot tones from among 8 pilot tones included in 4 26-tone resource units at positions corresponding to the 106-tone resource unit or correspond to positions of 4 pilot tones from among 8 pilot tones included in 2 52-tone resource units at positions corresponding to the 106-tone resource unit.

The 4 26-tone resource units and 2 leftover tones may be present at the positions corresponding to the 106-tone resource unit, the 2 leftover tones being positioned between second and third 26-tone resource units from among the 4 26-tone resource units sequentially positioned, or wherein the 2 26-tone resource units and 2 leftover tones may be present at the positions corresponding to the 106-tone resource unit, the 2 leftover tones being positioned between the 2 26-tone resource units sequentially positioned.

The position of the first pilot tone may correspond to a position of one of 2 pilot tones included in the first 26-tone resource unit, the position of the second pilot tone may correspond to a position of one of 2 pilot tones included in the second 26-tone resource unit, the position of the third pilot tones may correspond to a position of one of 2 pilot tones included in the third 26-tone resource unit, and the position of the fourth pilot tones may correspond to a position of one of 2 pilot tones included in the fourth 26-tone resource unit.

The position of the first pilot tone may correspond to a position of one of the 2 pilot tones included in the first 26-tone resource unit, which is a longer distance from the 2 leftover tones, the position of the second pilot tone may correspond to a position of one of the 2 pilot tones included in the second 26-tone resource unit, which is a longer distance from the 2 leftover tones, the position of the third pilot tone may correspond to a position of one of the 2 pilot tones included in the third 26-tone resource unit, which is a longer distance from the 2 leftover tones, and the position of the fourth pilot tone may correspond to a position of one of the 2 pilot tones included in the fourth 26-tone resource unit, which is a longer distance from the 2 leftover tones.

When 26 tones included in each 26-tone resource unit are sequentially positioned at indices 0 to 25, 2 pilot tones included in each 26-tone resource unit may be respectively positioned at the indices 6 and 20.

The position of the first pilot tone may correspond to a position of one of the 2 pilot tones included in the first 26-tone resource unit, which is positioned at the index 6, the position of the second pilot tone may correspond to a position of one of the 2 pilot tones included in the second 26-tone resource unit, which is positioned at the index 6, the position of the third pilot tone may correspond to a position of one of the 2 pilot tones included in the third 26-tone resource unit, which is positioned at the index 20, and the position of the fourth pilot tone may correspond to a position of one of the 2 pilot tones included in the fourth 26-tone resource unit, which is positioned at the index 20.

When 106 tones included in the 106-tone resource unit are sequentially positioned at indices 0 to 105, the first pilot tone may be positioned at the index 6, the second pilot tone may be positioned at the index 32, the third pilot tone may be positioned at the index 74, and the fourth pilot tone may be positioned at the index 100.

An STA in a WLAN system according to another embodiment of the present invention includes an RF unit for transmitting and receiving RF signals and a processor for controlling the RF unit, wherein the processor is configured to generate a physical protocol data unit (PPDU) including a physical preamble and a data field and to transmit the PPDU, wherein, when the data field is transmitted using a 106-tone resource unit including first to fourth pilot tones, positions of the first to fourth pilot tones correspond to positions of 4 pilot tones from among 8 pilot tones included in 4 26-tone resource units at positions corresponding to the 106-tone resource unit or correspond to positions of 4 pilot tones from among 8 pilot tones included in 2 52-tone resource units at positions corresponding to the 106-tone resource unit.

The 4 26-tone resource units and 2 leftover tones may be present at the positions corresponding to the 106-tone resource unit, the 2 leftover tones being positioned between second and third 26-tone resource units from among the 4 26-tone resource units sequentially positioned, or wherein the 2 26-tone resource units and 2 leftover tones may be present at the positions corresponding to the 106-tone resource unit, the 2 leftover tones being positioned between the 2 26-tone resource units sequentially positioned.

The position of the first pilot tone may correspond to a position of one of 2 pilot tones included in the first 26-tone resource unit, the position of the second pilot tone may correspond to a position of one of 2 pilot tones included in the second 26-tone resource unit, the position of the third pilot tones may correspond to a position of one of 2 pilot tones included in the third 26-tone resource unit, and the position of the fourth pilot tones may correspond to a position of one of 2 pilot tones included in the fourth 26-tone resource unit.

The position of the first pilot tone may correspond to a position of one of the 2 pilot tones included in the first 26-tone resource unit, which is a longer distance from the 2 leftover tones, the position of the second pilot tone may correspond to a position of one of the 2 pilot tones included in the second 26-tone resource unit, which is a longer distance from the 2 leftover tones, the position of the third pilot tone may correspond to a position of one of the 2 pilot tones included in the third 26-tone resource unit, which is a longer distance from the 2 leftover tones, and the position of the fourth pilot tone may correspond to a position of one of the 2 pilot tones included in the fourth 26-tone resource unit, which is a longer distance from the 2 leftover tones.

When 26 tones included in each 26-tone resource unit are sequentially positioned at indices 0 to 25, 2 pilot tones included in each 26-tone resource unit may be respectively positioned at the indices 6 and 20.

The position of the first pilot tone may correspond to a position of one of the 2 pilot tones included in the first 26-tone resource unit, which is positioned at the index 6, the position of the second pilot tone may correspond to a position of one of the 2 pilot tones included in the second 26-tone resource unit, which is positioned at the index 6, the position of the third pilot tone may correspond to a position of one of the 2 pilot tones included in the third 26-tone resource unit, which is positioned at the index 20, and the position of the fourth pilot tone may correspond to a position of one of the 2 pilot tones included in the fourth 26-tone resource unit, which is positioned at the index 20.

When 106 tones included in the 106-tone resource unit are sequentially positioned at indices 0 to 105, the first pilot tone may be positioned at the index 6, the second pilot tone may be positioned at the index 32, the third pilot tone may be positioned at the index 74, and the fourth pilot tone may be positioned at the index 100.

Advantageous Effects

The present invention can reduce overhead of preambles and PLOP headers of the legacy WLAN system and design an efficient PPDU transmission structure to improve system efficiency. Specifically, the present invention supplements and extends the multi-stream pilot design method proposed in IEEE 802.11n to propose an efficient pilot design method applicable to a new frame structure and numerology of a future WLAN system.

Various effects of the present invention will be described in detail below with reference to the attached drawings.

DESCRIPTION OF DRAWINGS

FIG. 1 is a diagram showing an example of an IEEE 802.11 system to which the present invention may be applied;

FIG. 2 is a diagram illustrating the structure of a layer architecture of an IEEE 802.11 system to which the present invention may be applied;

FIG. 3 illustrates a non-HT format PPDU and an HT format PPDU in a wireless communication system to which the present invention may be applied;

FIG. 4 illustrates a VHT format PPDU in a wireless communication system to which the present invention may be applied;

FIG. 5 illustrates constellation diagrams for classifying a PPDU format in a wireless communication system to which the present invention may be applied;

FIG. 6 illustrates a MAC frame format in an IEEE 802.11 system to which the present invention may be applied;

FIG. 7 illustrates an HT format of an HT control field in a wireless communication system to which the present invention may be applied;

FIG. 8 illustrates a VHT format of the HT control field in a wireless communication system to which the present invention may be applied;

FIG. 9 is a diagram illustrating a normal link setup procedure in a wireless communication system to which the present invention may be applied;

FIG. 10 is a diagram illustrating a random backoff period and a frame transmission procedure in a wireless communication system to which the present invention may be applied;

FIGS. 11 to 14 are diagrams illustrating a high efficiency (HE) format PPDU according to an embodiment of the present invention;

FIGS. 15 to 17 are diagrams illustrating a resource allocation unit in an OFDMA multi-user transmission method according to an embodiment of the present invention;

FIG. 16 illustrates a case in which a PPDU bandwidth is 40 MHz;

FIG. 17 illustrates a case in which a PPDU bandwidth is 80 MHz;

FIG. 18 is a diagram illustrating pilot tone plans of legacy systems;

FIGS. 19 to 22 are tables showing values of pilot tones depending on number of streams according to an embodiment of the present invention;

FIG. 23 is a table showing sequence groups for generating pilot values according to an embodiment of the present invention;

FIGS. 24 and 25 are tables showing values of pilot tones depending on number of streams according to an embodiment of the present invention;

FIGS. 26 and 27 are tables showing values of pilot tones depending on number of streams according to an embodiment of the present invention;

FIG. 28 is a table showing sequence groups for generating pilot values according to an embodiment of the present invention;

FIGS. 29 and 30 are tables showing values of pilot tones depending on number of streams according to an embodiment of the present invention;

FIG. 31 is a table showing sequence groups for generating pilot values according to an embodiment of the present invention;

FIG. 32 is a diagram illustrating positions of pilot tones included in 106 tone resource units;

FIG. 33 is tables showing values of pilot tones allocated per STA according to an embodiment of the present invention; and FIG. 34 is a flowchart illustrating a data transmission method of an STA device according to an embodiment of the present invention.

FIG. 35 is a block diagram of each STA device according to an embodiment of the present invention.

BEST MODES

The terms used in this specification were selected to include current, widely-used, general terms, in consideration of the functions of the present invention. However, the terms may represent different meanings according to the intentions of the skilled person in the art or according to customary usage, the appearance of new technology, etc. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

In addition, embodiments will be described in detail with reference to the accompanying drawings and contents illustrated in the accompanying drawings, but the present invention is not limited by the embodiments.

Hereinafter, embodiments of the present invention will be described in detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the structure of a layer architecture of an IEEE 802.11 system to which an embodiment of the present invention may be applied.

Referring to FIG. 2, the layer architecture of an IEEE 802.11 system may include a medium access control (MAC) sublayer/layer and a physical (PHY) sublayer/layer.

PHY may be divided into a physical layer convergence procedure (PLOP) entity and a physical medium dependent (PMD) entity. In this case, the PLOP entity connects MAC and data frames and the PMD entity wirelessly transmits/receives data to/from two or more STAs.

Both MAC and PHY may include management entities which may be respectively called a MAC sublayer management entity (MLME) and a physical sublayer management entity (PLME). Such management entities provide a layer management service interface through operation of a layer management function. The MLME may be connected to the PLME and perform MAC management operation and the PLME may be connected to the MLME and perform PHY management operation.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

PHY provides an interface to MAC through TXVECTOR, RXVECTOR and PHYCONFIG_VECTOR. TXVECTOR supports a transmission parameter per PPDU for PHY. PHY notifies MAC of a received PPDU parameter using RXVECTOR. TXVECTOR is delivered from MAC to PHY through PHY-TXSTART.request primitive and RXVECTOR is delivered from PHY to MAC through PHY-RXSTART.indication premitive.

MAC sets operation of PHY using PHYCONFIG_VECTOR irrespective of frame transmission or reception.

Operation of each sublayer (or layer) will be briefly described.

MAC attaches a MAC header and a frame check sequence (FCS) to a MAC service data unit (MSDU) received from a higher layer (e.g., LLC) or a fragment of the MSDU to generate one or more MAC protocol data units (MPDUs). The generated MPDUs are delivered to PHY.

When an aggregated MSDU (A-MSDU) scheme is used, a plurality of MSDUs may be aggregated into a single A-MSDU. MSDU aggregation may be performed in a layer higher than MAC. A-MSDU is delivered to PHY as a single MPDU (when the MPDU is not fragmented).

PHY attaches an additional field including information necessary for a physical layer transceiver to a physical service data unit (PSDU) received from MAC to generate a physical protocol data unit (PPDU). The PPDU is transmitted through a radio medium.

Since the PSDU is received by PHY from MAC and the MPDU is transmitted from MAC to PHY, the PSDU is substantially the same as the MPDU.

When an aggregated MPDU (A-MPDU) scheme is used, a plurality of MPDUs (here, each MPDU may carry A-MSDU) may be aggregated into a single A-MPDU. MPDU aggregation may be performed in a layer lower than MAC. A-MPDU may be obtained by aggregating various types of MPDUs (e.g., QoS data, ACK (Acknowledge), block ACK, etc.). PHY receives the A-MPDU from MAC as a single PSDU. That is, a PSDU is composed of a plurality of MPDUs. Accordingly, the A-MPDU is transmitted in a single PPDU through a radio medium.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field. The L-SIG field may include information on a data rate and data length FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4 illustrates a VHT format PPDU for supporting an IEEE 802.11ac system.

Referring to FIG. 4, the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 1 illustrates the VHT-SIG-A1 field.

TABLE 1

| Field | Bit | Description |
| --- | --- | --- |
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU, Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP) |

TABLE 1-continued

| Field | Bit | Description |
| --- | --- | --- |
| Reserved | 1 | Set to "1" if not<br>In the case of a VHT PPDU transmitted by a non-AP VHT STA<br>Set to "1" |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| Field | Bit | Description |
| --- | --- | --- |
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

VHT-STF field duration is 4 μs. A frequency domain sequence used to configure the VHT-STF in a transmission bandwidth of 20 MHz may be the same as that of the L-STF. The VHT-STF in transmission bandwidths of 40 MHz/80

MHz may be configured by duplicating a frequency domain sequence in a transmission bandwidth of 20 MHz in units of 20 MHz and performing phase rotation in units of the duplicated 20 MHz.

The VHT-LTF is used for a VHT-STA to estimate MIMO channels.

Since a VHT WLAN system supports MU-MIMO, as many VHT-LTFs as the number of spatial streams in which PPDUs are transmitted may be configured. Additionally, when full channel sounding is supported, the number of VHT-LTFs may increase.

The VHT-SIG-B field includes dedicated control information necessary for a plurality of MU-MIMO paired VHT-STAs to receive PPDUs and obtain data. Accordingly, VHT-STAs may be designed to decode the VHT-SIG-B field only when common control information included in the VHT-SIG-A field indicates that a currently received PPDU is for MU-MIMO transmission. When the common control information indicates that the currently received PPDU is for a single VHT-STA (including SU-MIMO), STAs may be designed not to decode the VHT-SIG-B field.

The VHT-SIG-B field includes information about modulation, encoding and rate matching of each VHT-STA. The size of the VHT-SIG-B field may depend on MIMO transmission type (MU-MIMO or SU-MIMO) and a channel bandwidth used for PPDU transmission.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

FIG. 5 illustrates constellation diagrams for classifying a PPDU format in a wireless communication system to which the present invention may be applied.

(a) of FIG. 5 illustrates a constellation for the L-SIG field included in the non-HT format PPDU, (b) of FIG. 5 illustrates a phase rotation for HT-mixed format PPDU detection, and (c) of FIG. 5 illustrates a phase rotation for VHT format PPDU detection.

In order for an STA to classify a PPDU as a non-HT format PPDU, HT-GF format PPDU, HT-mixed format PPDU, or VHT format PPDU, the phases of constellations of the L-SIG field and of the OFDM symbols, which are transmitted following the L-SIG field, are used. That is, the STA may classify a PDDU format based on the phases of constellations of the L-SIG field of a received PPDU and/or of the OFDM symbols, which are transmitted following the L-SIG field.

Referring to (a) of FIG. 5, the OFDM symbols of the L-SIG field use BPSK (Binary Phase Shift Keying).

To begin with, in order to classify a PPDU as an HT-GF format PPDU, the STA, upon detecting a first SIG field from a received PPDU, determines whether this first SIG field is an L-SIG field or not. That is, the STA attempts to perform decoding based on the constellation illustrated in (a) of FIG. 5. If the STA fails in decoding, the corresponding PPDU may be classified as the HT-GF format PPDU.

Next, in order to distinguish the non-HT format PPDU, HT-mixed format PPDU, and VHT format PPDU, the phases of constellations of the OFDM symbols transmitted following the L-SIG field may be used. That is, the method of modulation of the OFDM symbols transmitted following the L-SIG field may vary, and the STA may classify a PPDU format based on the method of modulation of fields coming after the L-SIG field of the received PPDU.

Referring to (b) of FIG. 5, in order to classify a PPDU as an HT-mixed format PPDU, the phases of two OFDM symbols transmitted following the L-SIG field in the HT-mixed format PPDU may be used.

More specifically, both the phases of OFDM symbols #1 and #2 corresponding to the HT-SIG field, which is transmitted following the L-SIG field, in the HT-mixed format PPDU are rotated counterclockwise by 90 degrees. That is, the OFDM symbols #1 and #2 are modulated by QBPSK (Quadrature Binary Phase Shift Keying). The QBPSK constellation may be a constellation which is rotated counterclockwise by 90 degrees based on the BPSK constellation.

An STA attempts to decode the first and second OFDM symbols corresponding to the HT-SIG field transmitted after the L-SIG field of the received PDU, based on the constellations illustrated in (b) of FIG. 5. If the STA succeeds in decoding, the corresponding PPDU may be classified as an HT format PPDU.

Next, in order to distinguish the non-HT format PPDU and the VHT format PPDU, the phases of constellations of the OFDM symbols transmitted following the L-SIG field may be used.

Referring to (c) of FIG. 5, in order to classify a PPDU as a VHT format PPDU, the phases of two OFDM symbols transmitted after the L-SIG field may be used in the VHT format PPDU.

More specifically, the phase of the OFDM symbol #1 corresponding to the VHT-SIG-A coming after the L-SIG field in the HT format PPDU is not rotated, but the phase of the OFDM symbol #2 is rotated counterclockwise by 90 degrees. That is, the OFDM symbol #1 is modulated by BPSK, and the OFDM symbol #2 is modulated by QBPSK.

The STA attempts to decode the first and second OFDM symbols corresponding to the VHT-SIG field transmitted following the L-SIG field of the received PDU, based on the constellations illustrated in (c) of FIG. 5. If the STA succeeds in decoding, the corresponding PPDU may be classified as a VHT format PPDU.

On the contrary, If the STA fails in decoding, the corresponding PPDU may be classified as a non-HT format PPDU.

MAC Frame Format

FIG. 6 illustrates a MAC frame format in an IEEE 802.11 system to which the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 illustrates an HT format of an HT control field in a wireless communication system to which the present invention is applicable.

Referring to FIG. 7, the HT control field may include a VHT sub-field, an HT control middle sub-field, an AC constraint sub-field and a reverse direction grant (RDG)/more PPDU sub-field.

The VHT sub-field indicates whether the HT control field has an HT control field format for VHT (VHT=1) or an HT control field format for HT (VHT=0). In FIG. 7, the HT control field for HT (i.e., VHT=0) is assumed.

The HT control middle sub-field may have a different format according to indication of the VHT sub-field. The HT control middle sub-field will be described below in more detail.

The AC constraint sub-field indicates whether a mapped access category (AC) of a reverse direction (RD) data frame is limited to a single AC.

The RDG/more PPDU sub-field may be interpreted differently depending on whether the corresponding field is transmitted by an RD initiator or an RD responder.

In the case of transmission by the RD initiator, the RDG/more PPDU field is set to "1" when an RDG is present and to "0" when an RDG is not present. In the case of transmission by the RD responder, the RDG/more PPDU field is set to "1" when a PPDU including the corresponding sub-field is the last frame transmitted by the RD responder and to "0" when another PPDU is transmitted.

The HT control middle sub-field of the HT control field for HT may include a link adaptation sub-field, a calibration position sub-field, a calibration sequence sub-field, a reserved sub-field, a channel state information (CSI)/steering sub-field, an HT null data packet (NDP) announcement sub-field, and a reserved sub-field.

The link adaption sub-field may include a training request (TRQ) sub-field, a modulation and coding scheme (MCS) request or antenna selection (ASEL) indication (MAI) sub-field, an MCS feedback sequence identifier (MFSI) sub-field and an MCS feedback and antenna selection command/data (MFB/ASELC) sub-field.

The TRQ sub-field is set to "1" when a responder is requested to transmit a sounding PPDU and is set to "0" when the responder is not requested to transmit a sounding PPDU.

When the MAI sub-field is set to 14, the MAI sub-field indicates ASEL indication and the MFB/ASELC sub-field is interpreted as antenna selection command/data. If not, the MAI sub-field indicates MCS request and the MFB/ASELC sub-field is interpreted as MCS feedback.

When the MAI sub-field indicates MCS request (MRQ), the MAI sub-field is considered to be composed of an MRQ (MCS request) and an MSI (MRQ sequence identifier). The MRQ sub-field is set to "1" when MCS feedback is request and set to "0" when MCS feedback is not requested. When the MRQ sub-field is "1", the MSI sub-field includes a sequence number for specifying MCS feedback request. When the MRQ sub-field is "0", the MSI sub-field is set to a reserved bit.

The above-described sub-fields correspond to exemplary sub-fields that may be included in the HT control field and may be replaced by other sub-fields, or additional sub-fields may be included in the HT control field.

FIG. 8 illustrates a VHT format of the HT control field in a wireless communication system to which the present invention is applicable.

Referring to FIG. 8, the HT control field may include a VHT sub-field, an HT control middle sub-field, an AC constraint sub-field and an RDG/more PPDU sub-field.

In FIG. 8, the HT control field for VHT (i.e., VHT=1) is assumed. The HT control field for VHT may be referred to as a VHT control field.

The AC constraint sub-field and the RDG/more PPDU sub-field are identical to those shown in FIG. 7 and thus description thereof is omitted.

As described above, the HT control middle sub-field may have a format depending on indication of the VHT sub-field.

The HT control middle sub-field of the HT control field for VHT may include a reserved bit, an MCS feedback request (MRQ) sub-field, an MRQ sequence identifier (MSI)/space-time block coding (STBC) sub-field, an MCS feedback sequence identifier (MFSI)/least significant bit (LSB) of group ID (GID-L) sub-field, an MCS feedback (MFB) sub-field, an MSB of group ID (GID-H) sub-field, a coding type sub-field, a feedback transmission (FB Tx) type sub-field and an unsolicited MFB sub-field.

Table 3 shows definition of each sub-field included in the HT control middle sub-field of the VHT format.

TABLE 3

| Sub-field | Meaning | Definition |
|---|---|---|
| MRQ | MCS request | Set to "1" when MCS feedback (solicited MFB) is requested and set to "0" if not. |
| MSI | MRQ sequence identifier | When the unsolicited MFB sub-field is "0" and the MRQ sub-field is set to "1", the MSI sub-field includes a sequence number in the range of 0 to 6 for identifying a specific request. When the unsolicited MFB sub-field is "1", this includes a compressed MSI sub-field (2 bits) and an STBC indication sub-field (1 bit). |
| MFSI/ GID-L | MFB sequence identifier/ LSB of Group ID | When the unsolicited MFB sub-field is set to "0", the MFSI/GID-L sub-field includes an MSI reception value included in a frame related to MFB information. When the unsolicited MFB sub-field is set to "1" and MFB is estimated from an MU PPDU, the MFSI/GID-L sub-field includes 3 LSBs of a group ID of the PPDU from which MFB is estimated. |
| MFB | VHT N_STS, MCS, BW, SNR feedback | The MFB sub-field includes recommended MFB. VHT-MCS = 15 and NUM STS = 7 indicate that feedback is not present. |
| GID-H | MSB of Group ID | When the unsolicited MFB sub-field is set to "1" and MFB is estimated from a VHT MU PPDU, the GID-H sub-field includes 3 MSBs of a group ID of the PPDU from which unsolicited MFB is estimated. MFB is estimated from an SU PPDU and the GID-H sub-field is set to "1". |
| Coding Type | Coding type of MFB response | When the unsolicited MFB sub-field is set to "1", the coding type sub-field includes coding type (BCC (binary convolutional code) being 0 and LDPC (low-density parity check) being 1) of a frame in which unsolicited MFB is estimated. |
| FB Tx Type | Transmission type of MFB response | When the unsolicited MFB sub-field is set to "1" and MFB is estimated from an unbeamformed VHT PPDU, the FB Tx type sub-field is set to "0". When the unsolicited MFB sub-field is set to "1" and MFB is estimated from a beamformed VHT PPDU, the FB Tx type sub-field is set to "1". |

TABLE 3-continued

| Sub-field | Meaning | Definition |
|---|---|---|
| Unsolicited MFB | Unsolicited MCS feedback indicator | When MFB is a response to MRQ, this is set to "1". When MFB is not a response to MRQ, this is set to "0". |

In addition, the MFB sub-field may include a VHT NUM_STS (number of space time streams) sub-field, a VHT-MCS sub-field, a bandwidth (BW) sub-field and an SNR (signal to noise ratio) sub-field.

The NUM_STS sub-field indicates the number of recommended spatial streams. The VHT-MCS sub-field indicates a recommended MCS. The BW sub-field indicates bandwidth information related to the recommended MCS. The SNR sub-field indicates an average SNR in data subcarriers and spatial streams.

The information included in the aforementioned fields may conform to definition of the IEEE 802.11 system. Further, the aforementioned fields correspond to exemplary fields that can be included in a MAC frame but are not limited thereto. That is, the aforementioned fields may be replaced by other fields or additional fields may be further included, and all fields may not be necessarily included.

Link Setup Procedure

FIG. 9 is a diagram illustrating a normal link setup procedure in a wireless communication system to which the present invention is applicable.

When an STA intends to set up a link for a network and transmit/receive data, the STA needs to perform a scanning procedure for discovering the network, an authentication procedure and an association procedure. The link setup procedure may also be referred to as a session setup procedure. The scanning, authentication and association procedures of the link setup procedure may be commonly called an association procedure.

In WLAN, the scanning procedure is divided into a passive scanning procedure and an active scanning procedure.

FIG. 9(*a*) illustrates a link setup procedure according to passive scanning and FIG. 9(*b*) illustrates a link setup procedure according to active scanning.

As illustrated in FIG. 9(*a*), the passive scanning procedure is performed through a beacon frame that is periodically broadcast by an AP. The beacon frame, one of management frames in IEEE 802.11, is broadcast periodically (e.g., at intervals of 100 msec) to indicate presence of a wireless network such that non-AP STAs performing scanning can discover the wireless network and join therein. The beacon frame carries information about the current network (e.g., information about a BSS).

To obtain network information, a non-AP STA waits for reception of the beacon frame while manually changing channels. Upon reception of the beacon frame, the non-AP STA stores the network information included in the received beacon frame, moves to the next channel and perform scanning on the next channel through the same method. When the non-AP STA receives the beacon frame to obtain the network information, the scanning procedure on the corresponding channel is completed.

In this way, the passive scanning procedure is finished when the non-AP STA receives the beacon frame without the need to transmit other frames and thus has an advantage of small overhead. However, scanning time of the non-AP STA increases compared to the beacon frame transmission interval.

The active scanning procedure, as illustrated in FIG. 9(b), a non-AP STA broadcasts a probe request frame while actively changing channels in order to search surrounding APs to request network information from all APs which receive the probe request frame.

A responder that has received the probe request frame loads network information in a probe response frame and transmits the probe response frame including the network information to the non-AP STA after waiting for a random time in order to prevent frame collision. Upon reception of the probe response frame, the STA may store network related information included in the received probe response frame, move to the next channel and perform scanning through the same method. The scanning procedure is completed when the non-AP STA receives the probe response frame to acquire the network information.

The active scanning procedure has an advantage of fast scanning compared to the passive scanning procedure. However, the active scanning procedure requires an additional frame sequence, increasing network overhead.

Upon completion of the scanning procedure, the non-AP STA selects a network on the basis of standards thereof and then performs the authentication procedure with respect to the corresponding AP.

The authentication procedure is performed through a process in which the non-AP STA transmits an authentication request frame to the AP and a process in which the AP transmits an authentication response frame to the non-AP STA in response to the authentication request frame, that is, 2-way handshaking.

Authentication frames used for authentication request/response correspond to management frames.

The authentication frames may include information about an authentication algorithm number, an authentication transaction sequence number, status code, challenge text, a robust security network (RSN), a finite cyclic group, etc. Such information corresponds to an example of information that may be included in the authentication request/response frames and may be replaced by other information, or additional information may be further included.

The non-AP STA may transmit the authentication request frame to the AP. The AP may determine whether to permit authentication of the non-AP STA on the basis of information included in the received authentication request frame. The AP may provide an authentication processing result to the non-AP STA through the authentication response frame.

The no-AP STA and the AP authenticate each other through the authentication procedure and then establish association.

The association procedure is performed through a process in which the non-AP STA transmits an association request frame to the AP and a process in which the AP transmits an association response frame to the non-AP STA in response to the association request frame, that is, 2-way handshaking.

The association request frame may include information about various capabilities of the non-AP STA and information about a beacon listen interval, a service set identifier (SSID), supported rates, supported channels, RSN, mobility domain, supported operating classes, traffic indication map (TIM) broadcast request, interworking service capabilities, etc.

Based on the association request frame, the AP determines whether the non-AP STA is supportable. After determination, the AP loads, in the association response frame, information about whether the association request is permitted, reason therefor and capabilities supportable by the AP and transmits the association response frame to the non-AP STA.

The association response frame may include information about various capabilities and information about status code, association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, TIM broadcast response, a quality of service (QOS) map, etc.

The aforementioned information that may be included in the association request/response frames is exemplary and may be replaced by other information or additional information may be further included.

When the non-AP STA has been successfully associated with the AP, normal transmission and reception are performed. Conversely, when the non-AP STA has not been successfully associated with the AP, the non-AP STA may re-attempt the association procedure or attempt association with another AP on the basis of the reason for the association failure.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present by applying the random backoff period, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 10 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $(2^n)-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 10, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 10 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA 2 is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 10 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 11 is a diagram illustrating an HT (High Efficiency) format PPDU according to an embodiment of the present invention.

Referring to FIG. 11, an HE format PPDU for HEW may be composed of a legacy part (L-part) and an HE part (HE-part).

The L-part includes the L-STF field, L-LTF field and L-SIG field in the same manner as that in previous WLAN systems. The L-STF field, L-LTF field and L-SIG field may be referred to as a legacy preamble.

The HE-part is a newly defined part for 802.11ax standards and may include an HE-SIG field, an HE preamble (HE-preamble) and data (HE-data). The HE-preamble may include an HE-STF field and an HE-LTF field. In addition, the HE-STF field, HE-LTF field and HE-SIG field may be commonly called the HE-preamble.

Although FIG. 11 illustrates the order of the HE-SIG field, HE-STF field and HE-LTF field, the order may be varied.

The L-part, HE-SIG field and HE-preamble may be commonly called a physical (PHY) preamble.

The HE-SIG field may include information (e.g., OFDMA, UL MU MIMO, enhanced MCS, etc.) for decoding the HE-data field.

The L-part and the HE-part (particularly, HE-preamble and HE-data) may have different FFT (Fast Fourier Transform) sizes and may use different CPs (cyclic prefixes). That is, different subcarrier frequency spacings may be defined for the L-part and the HE-part (particularly, HE-preamble and HE-data).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Although FIG. 11 illustrates a case in which the HE-SIG field is configured in a 1× symbol structure, the HE-SIG field may be configured in a 4× symbol structure like the HE-preamble and HE-data.

Differently from the example shown in FIG. 11, HE-SIG may be divided into an HE-SIG A field and an HE-SIG B field. In this case, an FFT size per unit frequency may further increase after HE-SIG B. That is, an OFDM symbol length may increase more than that in the L-part after HE-SIG B.

The HE format PPDU for a WLAN system to which the present invention is applicable may be transmitted through at least one 20 MHz channel. For example, the HE format PPDU may be transmitted in a frequency band of 40 MHz, 80 MHz or 160 MHz through a total of four 20 MHz channels. This will be described in more detail below with reference to the attached drawings.

FIG. 12 is a diagram illustrating an HE format PPDU according to an embodiment of the present invention.

FIG. 12 illustrates a PPDU format when 80 MHz is allocated to a single STA (or OFMDA resource units are allocated to a plurality of STAs within 80 MHz) or when different 80 MHz streams are respectively allocated to a plurality of STAs.

Referring to FIG. 12, L-STF, L-LTF and L-SIG may be transmitted through OFDM symbols generated on the basis of 64 FFT points (or 64 subcarriers) on each 20 MHz channel.

A HE-SIG-A field may include common control information commonly received by STAs which receive a PPDU. The HE-SIG-A field may be transmitted in 1 to 3 OFDM symbols. The HE-SIG-A field is duplicated for each 20 MHz and contains the same information. Also, the HE-SIG-A field indicates full bandwidth information of the system.

Table 4 illustrates information contained in the HE-SIG-A field.

TABLE 4

| Field | Bits | Description |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 4 may be as defined in the IEEE 802.11 system. Also, the above-described fields are examples of the fields that may be included in the PPDU but not limited to them. That is, the above-described fields may be substituted with other fields or further include additional fields, and not all of the fields may be necessarily included.

The HE-STF field is used to improve AGC estimation in MIMO transmission.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF, L-LTF, and L-SIG fields are transmitted through 64 FFT in a 20 MHz channel so that they can be received by a legacy STA. For example, the L-SIG field may occupy a single OFDM symbol, a single OFDM symbol time may be 4 µs, and a GI may be 0.8 µs.

An FFT size per unit frequency may be further increased from the HE-STF. For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 13 is a drawing illustrating an HE format PPDU according to an embodiment of the present invention.

In FIG. 13, it is assumed that 20 MHz channels are allocated to different STAs (e.g., STA 1, STA 2, STA 3, and STA 4).

Referring to FIG. 13, an FFT size per unit frequency may be further increased from the HE-SFT (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in a PPDU is the same as the example of FIG. 12, and thus, descriptions thereof will be omitted hereinafter.

The HE-SIG-B may include information specified to each STA but it may be encoded in the entire band (i.e., indicated in the HE-SIG-A field). That is, the HE-SIG-B field includes information regarding every STA and every STA receives the HE-SIG-B field.

The HE-SIG-B field may provide frequency bandwidth information allocated to each STA and/or stream information in a corresponding frequency band. For example, in FIG. 13, as for the HE-SIG-B, STA 1 may be allocated 20 MHz, STA 2 may be allocated a next 20 MHz, STA 3 may be allocated a next 20 MHz, and STA 4 may be allocated a next 20 MHz. Also, the STA 1 and STA 2 may be allocated 40 MHz and STA 3 and STA 4 may be allocated a next 40 MHz. In this case, STA 1 and STA 2 may be allocated different streams and STA 3 and STA 4 may be allocated different streams.

Also, an HE-SIG C field may be defined and added to the example of FIG. 13. Here, information regarding every STA may be transmitted in the entire band in the HE-SIG-B field, and control information specified to each STA may be transmitted by 20 MHz through the HE-SIG-C field.

Also, unlike the examples of FIGS. 12 and 13, the HE-SIG-B field may not be transmitted in the entire band but may be transmitted by 20 MHz, like the HE-SIG-A field. This will be described with reference to FIG. 24.

FIG. 14 is a diagram illustrating an HE format PPDU according to an embodiment of the present invention.

In FIG. 14, it is assumed that 20 MHz channels are allocated to different STAs (e.g., STA 1, STA 2, STA 3, and STA 4).

Referring to FIG. 14, the HE-SIG-B field is not transmitted in the entire band but is transmitted by 20 MHz, like the HE-SIG-A field. Here, however, unlike the HE-SIG-A field, the HE-SIG-B field may be encoded by 20 MHz and transmitted but may not be duplicated by 20 MHz and transmitted.

Here, an FFT size per unit frequency may be further increased from the HE-STF (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in the PPDU is the same as the example of FIG. 12, and thus, descriptions thereof will be omitted.

The HE-SIG-A field is duplicated by 20 MHz and transmitted.

The HE-SIG-B field may provide frequency bandwidth information allocated to each STA and/or stream information in a corresponding frequency band. Since the HE-SIG-B field includes information regarding each STA, information regarding each STA may be included in each HE-SIG-B field in units of 20 MHz. Here, in the example of FIG. 14, 20 MHz is allocated to each STA, but, in a case in which 40 MHz is allocated to an STA, the HE-SIG-B may be duplicated by 20 MHz and transmitted.

In a case where a partial bandwidth having a low level of interference from an adjacent BSS is allocated to an STA in a situation in which each BSS supports different bandwidths, the HE-SIG-B is preferably not transmitted in the entire band as mentioned above.

In FIGS. 11 to 14, a data field, as payload, may include a service field, a scrambled PSDU, a tail bit, and a padding bit.

Meanwhile, the HE format PPDU illustrated in FIGS. 11 to 14 may be distinguished through a repeated L-SIG (RL-SIG), a repeated symbol of an L-SIG field. The RL-SIG field is inserted in front of the HE SIG-A field, and each STA may identify a format of a received PPDU using the RL-SIG field, as an HE format PPDU.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

FIGS. 15 to 17 illustrate resource allocation units in an OFDMA multi-user transmission scheme according to an embodiment of the present invention.

When a DL/UL OFDMA transmission scheme is used, a plurality of resource units may be defined in units of n tones (or subcarriers) in a PPDU bandwidth. A resource unit refers to a frequency resource allocation unit for DL/UL OFDMA transmission.

One or more resource units are allocated per STA as DL/UL resource units such that different resource units may be allocated to a plurality of STAs.

FIG. 15 illustrates a case in which the PPDU bandwidth is 20 MHz.

7 DC tones may be positioned in a center frequency region of the 20 MHz PPDU bandwidth. In addition, 6 left guard tones and 5 right guard tones may be respectively positioned at both sides of the 20 MHz PPDU bandwidth.

According to a resource unit configuration scheme illustrated in FIG. 15(a), one resource unit may be composed of 26 tones (26-tone resource unit). Here, 4 leftover tones may neighbor 26-tone resource units in the 20 MHz PPDU bandwidth, as illustrated in FIG. 15(a). According to a resource unit configuration scheme illustrated in FIG. 15(b), one resource unit may be composed of 52 tones (52-tone resource unit) or 26 tones. Here, 4 leftover tones may neighbor 26-tone/52-tone resource units in the 20 MHz PPDU bandwidth, as illustrated in FIG. 15(b). According to a resource unit configuration scheme illustrated in FIG. 15(c), one resource unit may be composed of 106 tones (106-tone resource unit) or 26 tones. According to a resource unit configuration scheme illustrated in FIG. 15(d), one resource unit may be composed of 242 tones (242-tone resource unit).

When a resource unit is configured as illustrated in FIG. 15(a), up to 9 STAs may be supported for DL/UL OFDMA transmission in the 20 MHz band. When a resource unit is configured as illustrated in FIG. 15(b), up to 5 STAs may be supported for DL/UL OFDMA transmission in the 20 MHz band. When a resource unit is configured as illustrated in FIG. 15(c), up to 3 STAs may be supported for DL/UL OFDMA transmission in the 20 MHz band. When a resource unit is configured as illustrated in FIG. 15(d), 20 MHz may be allocated to one STA.

On the basis of the number of STAs participating in DL/UL OFDMA transmission and/or an amount of data transmitted or received by a corresponding STA, any one of the resource unit configuration schemes illustrated in FIGS. 15(a) to 15(d) may be applied or a combination of the resource unit configuration schemes of FIGS. 15(a) to 15(d) may be applied.

FIG. 16 illustrates a case in which the PPDU bandwidth is 40 MHz.

5 DC tones may be positioned in a center frequency region of the 40 MHz PPDU bandwidth. In addition, 12 left guard tones and 11 right guard tones may be respectively positioned at both sides of the 40 MHz PPDU bandwidth.

According to a resource unit configuration scheme illustrated in FIG. 16(a), one resource unit may be composed of 26 tones. Here, 16 leftover tones may neighbor 26-tone resource units in the 40 MHz PPDU bandwidth, as illustrated in FIG. 16(a). According to a resource unit configuration scheme illustrated in FIG. 16(b), one resource unit may be composed of 52 tones or 26 tones. Here, 16 leftover tones may neighbor 26-tone/52-tone resource units in the 40 MHz PPDU bandwidth, as illustrated in FIG. 16(b). According to a resource unit configuration scheme illustrated in FIG. 16(c), one resource unit may be composed of 106 tones or 26 tones. Here, 8 leftover tones may neighbor 26-tone/106-tone resource units in the 40 MHz PPDU bandwidth, as illustrated in FIG. 16(c). According to a resource unit configuration scheme illustrated in FIG. 16(d), one resource unit may be composed of 242 tones. According to a resource unit configuration scheme illustrated in FIG. 16(e), one resource unit may be composed of 484 tones.

When a resource unit is configured as illustrated in FIG. 16(a), up to 18 STAs may be supported for DL/UL OFDMA transmission in the 40 MHz band. When a resource unit is configured as illustrated in FIG. 16(b), up to 10 STAs may be supported for DL/UL OFDMA transmission in the 40 MHz band. When a resource unit is configured as illustrated in FIG. 16(c), up to 6 STAs may be supported for DL/UL OFDMA transmission in the 40 MHz band. When a resource unit is configured as illustrated in FIG. 16(d), up to 2 STAs may be supported for DL/UL OFDMA transmission in the 40 MHz band. When a resource unit is configured as illustrated in FIG. 16(e), the resource unit may be allocated to one STA for SU DL/UL transmission in the 40 MHz band.

On the basis of the number of STAs participating in DL/UL OFDMA transmission and/or an amount of data transmitted or received by a corresponding STA, any one of the resource unit configuration schemes illustrated in FIGS. 16(a) to 16(e) may be applied or a combination of the resource unit configuration schemes of FIGS. 16(a) to 16(e) may be applied.

FIG. 17 illustrates a case in which the PPDU bandwidth is 80 MHz.

7 DC tones may be positioned in a center frequency region of the 80 MHz PPDU bandwidth. When the 80 MHz PPDU bandwidth is allocated to one STA (i.e., a resource unit composed of 996 tones is allocated to one STA), however, 5 DC tones may be positioned at the center frequency region. In addition, 12 left guard tones and 11 right guard tones may be respectively positioned at both sides of the 80 MHz PPDU bandwidth.

According to a resource unit configuration scheme illustrated in FIG. 17(a), one resource unit may be composed of 26 tones. Here, 32 leftover tones may neighbor 26-tone resource units in the 80 MHz PPDU bandwidth, as illustrated in FIG. 17(a). According to a resource unit configuration scheme illustrated in FIG. 17(b), one resource unit may be composed of 52 tones or 26 tones. Here, 32 leftover tones may neighbor 26-tone/52-tone resource units in the 80 MHz PPDU bandwidth, as illustrated in FIG. 17(b). According to a resource unit configuration scheme illustrated in FIG. 17(c), one resource unit may be composed of 106 tones or 26 tones. Here, 16 leftover tones may neighbor 26-tone/106-tone resource units in the 80 MHz PPDU bandwidth, as illustrated in FIG. 17(c). According to a resource unit configuration scheme illustrated in FIG. 17(d), one resource unit may be composed of 242 tones or 26 tones. According to a resource unit configuration scheme illustrated in FIG. 17(e), one resource unit may be composed of 484 tones or 26 tones. According to a resource unit configuration scheme illustrated in FIG. 17(f), one resource unit may be composed of 996 tones.

Figure 28:
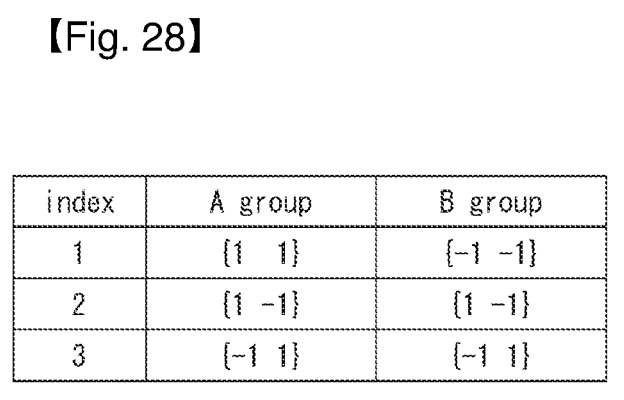

When a resource unit is configured as illustrated in FIG. 17(a), up to 37 STAs may be supported for DL/UL OFDMA transmission in the 80 MHz band. Also, when a resource unit is configured as illustrated in FIG. 17(b), up to 21 STAs may be supported for DL/UL OFDMA transmission in the 80 MHz band. Also, when a resource unit is configured as illustrated in FIG. 17(c), up to 13 STAs may be supported for DL/UL OFDMA transmission in the 80 MHz band. Also, when a resource unit is configured as illustrated in FIG. 17(d), up to 5 STAs may be supported for DL/UL OFDMA transmission in the 80 MHz band. Also, when a resource unit is configured as illustrated in FIG. 17(e), up to 3 STAs may be supported for DL/UL OFDMA transmission in the 80 MHz band. Also, when a resource unit is configured as illustrated in FIG. 28(f), a corresponding resource unit may be allocated to one STA for SU DL/UL transmission in the 80 MHz band.

On the basis of the number of STAs participating in DL/UL OFDMA transmission and/or an amount of data transmitted or received by a corresponding STA, any one of the resource unit configuration schemes illustrated in FIGS. 17(a) to 17(f) may be applied or a combination of the resource unit configuration schemes of FIGS. 17(a) to 17(f) may be applied.

In addition, although not shown, a resource unit configuration scheme in a case where a PPDU bandwidth is 160 MHz may also be proposed. In this case, the 160 MHz PPDU bandwidth may have a structure in which the aforementioned 80 MHz PPDU bandwidth is repeated twice.

Among the entire resource units determined according to the aforementioned resource unit configuration schemes, only some resource units may be used for DL/UL OFDMA transmission. For example, in a case where resource units are configured as illustrated in FIG. 17(a) within 20 MHz, one resource unit is allocated to each of less than 9 STAs and the other resource units may not be allocated to any STA.

In the case of DL OFDMA transmission, a data field of a PPDU is multiplexed in a frequency domain by the resource unit allocated to each STA and transmitted.

Meanwhile, in the case of UL OFDMA transmission, each STA may configure a data field of a PPDU by the resource unit allocated thereto and simultaneously transmit the PPDU to an AP. In this manner, since each STA simultaneously transmits the PPDU, the AP, a receiver, may recognize that the data field of the PPDU transmitted from each STA is multiplexed (or frequency multiplexed) in the frequency domain and transmitted.

Also, in a case where both DL/UL OFDMA transmission and DL/UL MU-MIMO transmission are supported, one resource unit may include a plurality of streams in a spatial domain. Also, one or more streams may be allocated as a DL/UL spatial resource to one STA, and thus, different streams may be allocated to a plurality of STAs.

For example, a resource unit comprised of 106 tones in FIG. 17(c) includes a plurality of streams in the spatial domain to support both DL/UL OFDMA and DL/UL MU-MIMO.

Pilot Tone Plan

As described above, when an 802.11ax system uses an FFT size quadruple (4×) that of the legacy WLAN system, it is difficult to apply the pilot deployment of the 802.11ac system. Therefore, the present invention proposes an efficient pilot design scheme suitable for numerology of the 802.11ax system by supplementing and extending the tone plan proposed in 802.11n and 802.11ac systems. Accordingly, a pilot tone plan according to an embodiment of the present invention will be described in detail after description of a pilot tone plan in legacy systems.

FIG. 18 illustrates pilot tone plans of legacy systems.

802.11n System

In the 802.11n system, 4 pilot tones are inserted into subcarriers and respectively positioned at indices of $\{-21, -7, 7, 21\}$ in the case of 20 MHz bandwidth transmission. In the case of 40 MHz bandwidth transmission, 6 pilot tones are inserted into subcarriers and respectively positioned at indices of $\{-53, -25, -11, 11, 25, 53\}$.

In the 802.11n system, a multi-stream pilot (MSP) scheme is used. Here, the MSP scheme refers to a scheme of using different pilot sequences depending on number of streams. Accordingly, pilot tone values (or pilot values) may be determined on the basis of the number of streams used for data transmission in the MSP scheme. The 802.11n system supports up to 4 streams.

In 20 MHz bandwidth transmission, pilot tones may be represented by a pilot sequence expressed by Equation 1 and pilot values corresponding to indices of $\{-21, -7, 7, 21\}$ may be determined as shown in the table of FIG. 18(a). In FIG. 18(a), NSTS indicates the number of streams, iSTS indicates a stream index and $\Psi_{i_{STS}}^{(N_{STS})}$ indicates a pilot value.

$$P_{(i_{STS},n)}^{-28,28} = \{0, 0, 0, 0, 0, 0, 0, \Psi_{i_{STS},n\oplus 4}^{(N_{STS})}, 0, 0, 0, 0, \quad \text{[Equation 1]}$$

$$0, 0, 0, 0, 0, 0, 0, 0, 0, \Psi_{i_{STS},(n+1)\oplus 4}^{(N_{STS})}, 0, 0, 0, 0, 0,$$

$$0, 0, 0, 0, 0, 0, 0, 0, \Psi_{i_{STS},(n+2)\oplus 4}^{(N_{STS})}, 0, 0, 0, 0, 0, 0, 0,$$

$$0, 0, 0, 0, 0, 0, 0, \Psi_{i_{STS},(n+3)\oplus 4}^{(N_{STS})}, 0, 0, 0, 0, 0, 0, 0, 0\}$$

For example, when data is transmitted using 2 streams, values of 4 pilot tones transmitted through a first stream (iSTS=1) may be determined as (1, 1, −1, −1) and values of 4 pilot tones transmitted through a second stream (iSTS=2) may be determined as (1, −1, −1, 1).

Further, in 40 MHz bandwidth transmission, pilot tones may be represented by a pilot sequence expressed by Equation 2 and pilot tone values corresponding to indices of {−53, −25, −11, 11, 25, 53} may be determined as shown in the table of FIG. 18(b). In FIG. 18(b), NSTS indicates the number of streams, iSTS indicates a stream index and $\Psi_{i_{STS}}^{(NSTS)}$ indicates a pilot value.

$$P_{(i_{STS},n)}^{-58,58} = \{0, 0, 0, 0, 0, \Psi_{i_{STS},n\oplus6}^{(NSTS)}, 0, 0, 0, 0, 0, 0, 0, 0, 0, 0, \quad \text{[Equation 2]}$$

$$0, 0, 0, 0, 0, 0, 0, 0, 0, 0, 0, 0, 0, 0, 0, 0, \Psi_{i_{STS}(n+1)\oplus6}^{(NSTS)},$$

$$0, 0, 0, 0, 0, 0, 0, 0, 0, 0, 0, 0, \Psi_{i_{STS}(n+2)\oplus6}^{(NSTS)}, 0,$$

$$0, 0, 0, 0, 0, 0, 0, 0, 0, 0, 0, 0, 0, 0, 0, 0, 0,$$

$$0, \Psi_{i_{STS}(n+3)\oplus6}^{(NSTS)}, 0, 0, 0, 0, 0, 0, 0, 0, 0, 0, 0, 0,$$

$$\Psi_{i_{STS}(n+4)\oplus6}^{(NSTS)}, 0, 0, 0, 0, 0, 0, 0, 0, 0, 0, 0, 0, 0, 0, 0,$$

$$0, 0, 0, 0, 0, 0, 0, 0, 0, 0, \Psi_{i_{STS}(n+5)\oplus6}^{(NSTS)}, 0, 0, 0, 0, 0\}$$

For example, when data is transmitted using 3 streams, values of 6 pilot tones transmitted through a first stream (iSTS=1) may be determined as (1, 1, −1, −1, −1, −1), values of 6 pilot tones transmitted through a second stream (iSTS=2) may be determined as (1, 1, 1, −1, 1, 1) and values of 6 pilot tones transmitted through a third stream (iSTS=3) may be determined as (1, −1, 1, −1, −1, 1).

802.11ac System

In the 802.11ac system, 4 pilot tones may be inserted into subcarriers and respectively positioned at indices of {−21, −7, 7, 21} in the case of 20 MHz bandwidth transmission. In the case of 40 MHz bandwidth transmission, 6 pilot tones may be inserted into subcarriers and respectively positioned at indices of {−53, −25, −11, 11, 25, 53}. In the case of 80 MHz bandwidth transmission, 8 pilot tones may be inserted into subcarriers and respectively positioned at indices of {−103, −75, −39, −11, 11, 39, 75, 103}. In the case of 160 MHz bandwidth transmission, 16 pilot tones may be inserted into subcarriers and respectively positioned at indices of {−231, −203, −167, −139, −117, −89, −53, −25, 25, 53, 89, 117, 139, 167, 203, 231}.

The 802.11ac system uses a single stream pilot (SSP) scheme. Here, the SSP scheme refers to a scheme of using a fixed pilot sequence per stream irrespective of the number of streams. For example, each pilot tone value Ψ may be determined irrespective of the number of streams as shown in the table of FIG. 18(c).

In the case of 20 MHz bandwidth transmission, pilot values of $\Psi_0$ to $\Psi_3$ may be applied. Accordingly, 4 pilot tones positioned at indices of {−21, −7, 7, 21} may sequentially have values of (1, 1, 1, −1) in the case of 20 MHz bandwidth transmission. In the case of 40 MHz bandwidth transmission, pilot values of $\Psi_0$ to $\Psi_5$ may be applied. Accordingly, 6 pilot tones positioned at indices of {−53, −25, −11, 11, 25, 53} may sequentially have values of (1, 1, 1, −1, −1, 1) in the case of 40 MHz bandwidth transmission. In the case of 80 MHz bandwidth transmission, pilot values of $\Psi_0$ to $\Psi_7$ may be applied. Accordingly, 8 pilot tones positioned at indices of {−103, −75, −39, −11, 11, 39, 75, 103} may sequentially have values of (1, 1, 1, −1, −1, 1, 1, 1) in the case of 80 MHz bandwidth transmission.

In case of 160 MHz bandwidth transmission, pilot values in 80 MHz bandwidth transmission may be duplicated and applied. Accordingly, 16 pilot tones positioned at indices of {−231, −203, −167, −139, −117, −89, −53, −25, 25, 53, 89, 117, 139, 167, 203, 231} may sequentially have values of (1, 1, 1, −1, −1, 1, 1, 1, 1, 1, 1, −1, −1, 1, 1, 1) in the case of 160 MHz bandwidth transmission.

Pilot tone plans in legacy systems have been described. A new pilot tone plan applicable to new systems on the basis of the above description is proposed. Particularly, the number, positions (or indices) and values (or coefficients) of pilot tones applicable to the 802.11ax system as pilot tone plans will be described in detail. The pilot tone plans may be divided into i) a pilot tone plan in a non-OFDMA (or MIMO) scheme and ii) a pilot tone plan in an OFDMA scheme.

A. Non-OFDMA Transmission (or MIMO Transmission)

The pilot tone plan in non-OFDMA transmission may include a design scheme using a tone plan of a legacy system and a design scheme not using a tone plan of a legacy system. Hereinafter, these two schemes will be described per bandwidth in detail.

1.20 MHz: 256 FFT

It is assumed that 256 subcarriers (or tones) of 20 MHz sequentially have indices of −128 to +127.

(1) First Embodiment—Embodiment 1 μSing Pilot Tone Plan of Legacy System

The Number of Pilot Tones

In the present embodiment, the number of pilot tones is 8. When the number of tones that can be used in 20 MHz is 242 (when the number of left guard tones is 6, the number of right guard tones is 5 and the number of DC tones is 3), the number of data tones is 234 (=242-8) if 8 pilot tones are used, and thus an interleaver of the legacy system may be used. Accordingly, use of 8 pilots in 20 MHz may be advantageous for implementation if there is no remarkable performance deterioration.

Pilot Tone Index (or Pilot Tone Position)

If the number of guard tones and the number of DC tones of the 802.11ax system are identical to those of a legacy system (802.11ac system), pilot tone positions in 80 MHz bandwidth transmission of the legacy (802.11ac) system may be reused as pilot tone positions in the 802.11ax system. In this case, accordingly, 8 pilot tones may be positioned at indices of {±11, ±39, ±75, ±103}.

HE-LTF may be transmitted with a 4×FFT size (4×HE-LTF). In addition, HE-LTF may be transmitted with a 2×FFT size in which data is loaded at intervals of 2 tones (or 1 tone for 2 tones) from among subcarriers to which 4×HE-LTF is mapped and data is not loaded (or has a value of "0") on the remaining tones in order to reduce symbol time. Here, HE-LTF may be transmitted as 2 HE-LTF in which data is loaded only on even-numbered tones (or tones positioned at even indices) from among tones of 4×HE-LTF and data is not loaded on odd-numbered tones (or tones positioned at even indices). In this case, accordingly, pilot tones need to be inserted into even-numbered tones (tones having even indices) from among subcarriers to which 4×HE-LTF is mapped. Even indices may be obtained by adding 1 to the aforementioned indices or subtracting 1 therefrom and the obtained even indices may be used as indices of pilot tones. For example, ±12 is obtained by adding 1 to ±11 and ±10 is obtained by subtracting 1 from ±11. Such correction into an even index may be equally applied to all embodiments in which indices are odd numbers even though redundant description is not given.

Pilot Tone Value (Pilot Value)

In the present embodiment, a pilot tone value may be determined according to the MSP scheme. Accordingly, a pilot tone value may be determined depending on number of streams.

FIGS. 19 to 22 are tables showing pilot tone values depending on number of streams according to an embodiment of the present invention. Particularly, FIG. 19 shows a case in which NSTS is 1, 2 and 3, FIG. 20 shows a case in which NSTS is 4 and 5, FIG. 21 shows a case in which NSTS is 6 and 7 and FIG. 22 shows a case in which NSTS is 8.

when NSTS is 1 (NSTS=1)

When NSTS is 1, values (FIG. 18(c)) of pilot tones of 80 MHz of the 802.11ac system may be used and thus pilot values of the present embodiment may be defined as shown in the table of FIG. 19(a). In FIG. 19(a), NSTS indicates the number of streams, iSTS indicates a stream index and $\psi^{NSTS,8}_{iSTS,j}$ indicates a value of a pilot tone at a j-th position from among 8 pilot tones in a stream having iSTS.

Pilot values of FIG. 18(c) and FIG. 19(a) are determined by applying mirror symmetry to pilot values when NSTS=1 and iSTS=1 in the 20 MHz bandwidth of the 802.11n system. In this manner, pilot values of the 20 MHz bandwidth of the 802.11n system may be reused, as represented by Equation 3.

$$\psi^{NSTS,8}_{iSTS,j} = \psi^{NSTS,11n}_{iSTS,j} \text{ (when } j=0,1,2,3)$$

$$\psi^{NSTS,8}_{iSTS,j} = \psi^{NSTS,8}_{iSTS,7-j} \text{ (when } j=4,5,6,7) \quad \text{[Equation 3]}$$

Here, $\psi^{NSTS,11n}_{iSTS,j}$ denotes a value of a pilot tone at a j-th position from among 8 pilot tones of a stream having iSTS in the 802.11n system.

When a legacy scheme in which various issues such as PAPR (Peak-to-Average Power Ratio) have been verified is used for pilot design, pilot performance may be guaranteed without additional verification and the burden of generating new pilot sequences may be reduced in terms of hardware implementation. When NSTS is 2 to 8, pilot values of the 802.11n system may be reused and the above description may be equally applied thereto.

When NSTS is 2 (NSTS=2)

When NSTS is 2, pilot values may be determined, as shown in FIG. 19(b), by applying mirror symmetry to pilot values when NSTS=2 in the 20 MHz bandwidth of the 802.11n system.

When NSTS is 3 (NSTS=3)

When NSTS is 3, pilot values may be determined, as shown in FIG. 19(c), by applying mirror symmetry to pilot values when NSTS=3 in the 20 MHz bandwidth of the 802.11n system.

When NSTS is 4 (NSTS=4)

When NSTS is 4, pilot values may be determined, as shown in FIG. 20(a), by applying mirror symmetry to pilot values when NSTS=4 in the 20 MHz bandwidth of the 802.11n system.

When NSTS is 5 to 8 (NSTS=5 to 8)

It is difficult to reuse pilot values of the 802.11n system when NSTS is 5 to 8 because the 802.11n system supports up to 4 streams. Accordingly, pilot values having orthogonality maintained per stream may be obtained by applying the property of Hadamard matrix as well as mirror symmetry to pilot values when NSTS=4 in the 20 MHz bandwidth of the 802.11n system and applied to cases in which NSTS=5 to 8. The property of Hadamard matrix is that if H1 and H2 are Hadamard matrices, [H1, H2; H1, -H2] are also Hadamard matrices. Here, H1 µs [1, 1, 1, -1; 1, 1, -1, 1; 1, -1, 1, 1; -1, 1, 1, 1] and H2 µs [-1, 1, 1, 1; 1, -1, 1, 1; 1, 1, -1, 1; 1, 1, 1, -1]. Pilot values generated using the aforementioned properties are shown in FIGS. 20(b), 21 and 22.

In addition to the above Hadamard matrix, there may be various Hadamard matrices below and pilot values when NSTS is 5 to 8 may be generated using such Hadamard matrices.

[H1, H1; H1, -H1], [H2, H2; H2, -H2], [H2, H1; H2, -H1], [H1, -H2; H1, H2], [H1, -H1; H1, H1], [H2, -H2; H2, H2], [H2, -H1; H2, H1], [H1, H2; -H1, H2], [H1, H1; -H1, H1], [H2, H2; -H2, H2], [H1, H1; H1, -H1], [H2, H1; -H2, H1], [-H1, H2; H1, H2], [-H1, H1; H1, H1], [-H2, H2; H2, H2], [-H2, H1; H2, H1], [H1, H2; H1, -H2], [H1, H2; -H1, H2]

Here, use of pilot values generated using the Hadamard matrix of [H1, H2; H1, -H2] or [H1, H2; -H1, H2] corresponds to reuse of pilot tone values in the 80 MHz bandwidth of the 802.11ac system.

When pilot values having orthogonality maintained per stream are used, transport diversity can be enhanced and undesired beamforming effects can be reduced.

(2) Second Embodiment—Embodiment 2 µSing Pilot Tone Plan of Legacy System

The Number/Indices of Pilot Tones

In the present embodiment, the number and indices of pilot tones conform to the scheme proposed in the first embodiment.

Pilot Tone Value (Pilot Value)

A unified SSP scheme that extends pilot values when NSTS=8 in the first embodiment to pilot values when NSTS=1 to 7 and uses the pilot values as pilot tone values is proposed. According to this SSP scheme, pilot tones of each stream may have fixed pilot values irrespective of the number of streams. For example, when pilot values shown in FIG. 22 are used, pilot tones of the first stream (iSTS=1) may have a fixed pilot sequence of (1, 1, 1, -1, -1, 1, 1, 1) irrespective of the number of streams.

When unified pilot values are used in this manner, system configuration is simplified and the burden of implementation of hardware is reduced.

(3) Third Embodiment—Embodiment of Deciding Pilot Values Through Pilot Sequence Pairing The Number/Indices of Pilot Tones In the present embodiment, the number and indices of pilot tones conform to the scheme proposed in the first embodiment.

Pilot Tone Values (Pilot Values)

FIG. 23 is a table showing sequence groups for generating pilot values according to an embodiment of the present invention. In FIG. 23, orthogonality is maintained between sequences of groups A to C. Further, the sequence of group B and the sequence of group C have opposite signs at the same index.

8 sequences having a length of 8 may be generated by one-to-one mapping the sequence of group A to the sequence of group B and one-to-one mapping the sequence of group A to the sequence of group C. During mapping, sequences having the same index are mapped and orthogonality is maintained between the 8 sequences generated. The 8 sequences generated in this manner may be applied as fixed pilot sequences of a stream having a specific index (iSTS) according to the SSP scheme. Here, stream indices (iSTS=1 to 8) may be randomly assigned to the 8 pilot sequences.

(4) Fourth Embodiment—Embodiment of Using Some Pilot Positions

Number of Pilot Tones
In the present embodiment, the number of pilot tones is 4.
Index of Pilot Tone (Position of Pilot Tone)
In the present embodiment, 4 pilot tone indices are selected from pilot tone indices {±11, ±39, ±75, ±103} proposed in the first to third embodiments and used.

As an embodiment, pilot tone indices may be selected from the indices proposed in the first to third embodiments at intervals of two from the first index. In this case, pilot tone indices may be {−103, −39, +11, +75}.

As another embodiment, pilot tone indices may be selected from the indices proposed in the first to third embodiments at intervals of two from the second index. In this case, pilot tone indices may be {−75, −11, +39, +103}.

As another embodiment, pilot tone indices may be selected such that negative indices and positive indices are symmetrical in the first to third embodiments. Accordingly, pilot tone indices may be {±11, ±39}, {±1 1, ±75}, {±11, ±103}, {±39, ±75}, {±39, ±103} or {±75, ±103}.

Pilot Tone Value (Pilot Value)
Pilot tone values conform to a scheme proposed in the twenty-eighth, twenty-ninth or thirtieth embodiment which will be described below. This will be described in detail below.

(5) Fifth Embodiment—Embodiment of Applying Pilot Tone Plan of 802.11ac System Number of Pilot Tones
In the present embodiment, the number of pilot tones is 4.
Pilot Tone Index (or Pilot Tone Position)
In the present embodiment, pilot tone indices may be obtained by 4× upscaling pilot tone indices of the 20 MHz bandwidth in the 802.11ac system. In this case, upscaled pilot indices may be {±28, ±84}.
Pilot Tone Value (Pilot Value)
Pilot tone values conform to the scheme proposed in the twenty-eighth, twenty-ninth or thirtieth embodiment which will be described below. This will be described in detail below.

(6) Sixth Embodiment—Embodiment of Deciding the Number of Pilot Tones Depending on Number of Streams When the number of pilot tones is reduced, the number of data tones (tones carrying data) increases and thus a larger amount of data may be transmitted. However, as many orthogonal sequences as a reduced number of pilot tones cannot be generated. Accordingly, a scheme of applying the number of pilot tones depending on a total number of streams is proposed in order to increase the amount of transmitted data as follows.

The scheme proposed in the fifth embodiment is employed when the total number of streams is less than 4 and one of the schemes proposed in the first to fourth embodiments is employed when the total number of streams is 4 to 8.

(7) Seventh Embodiment—Embodiment of Using the Same Pilot Sequence Irrespective of the Number of Streams The present embodiment proposes a pilot tone plan that applies one fixed pilot sequence irrespective of the number of streams as in the SSP scheme of the 802.11ac system.

Accordingly, when the number of pilot tones is 8, pilot tone indices (or positions) and values may conform to the scheme proposed in the first embodiment when NSTS=1. When the number of pilot tones is 4, pilot tone indices (or positions) may conform to the scheme proposed in the fifth embodiment and pilot tone values may conform to the scheme proposed in the twenty-eighth embodiment which will be described below.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

2. 40 MHz: 512 FFT
It is assumed that 512 subcarriers (or tones) of the 40 MHz bandwidth sequentially have indices of −256 to +255.

(1) Eighth Embodiment—Extended Embodiment of First to Third Embodiments

Number of Pilot Tones
In the present embodiment, the number of pilot tones is 16. If the number of tones that may be used in the 40 MHz bandwidth is 484, 484 tones may be divided into 2 tone groups each having 242 (the number of tones that may be used in the 20 MHz bandwidth) tones. Here, when 16 tones are used as pilot tones in each tone group, 234 (=242−16) data tones may be used, and thus an interleaver of a legacy system may be used. Accordingly, use of 16 pilots in 40 MHz may be advantageous for implementation if there is no remarkable performance deterioration.

Pilot Tone Index (or Pilot Tone Position)
In the 802.11ac system, the pilot tone plan of the 160 MHz bandwidth is designed by duplicating the plot tone plan of the 80 MHz bandwidth. Similarly, the present embodiment may decide pilot tone indices of the 40 MHz bandwidth by duplicating pilot tone indices (pilot tone indices proposed in the first to third embodiments) of the 20 MHz bandwidth. Accordingly, the pilot tone indices may be determined as {±25, ±53, ±89, ±117, ±139, ±167, ±203, ±231} in the present embodiment.

In this way, the scheme of duplicating a tone plan of a specific bandwidth and using the duplicated tone plan can store only one tone plan with respect to a specific bandwidth, duplicate the tone plan and use the duplicated tone plan without storing a pilot tone plan per bandwidth, simplifying system configuration.

Pilot Tone Value (Pilot Value)
Pilot tone values of the 40 MHz bandwidth may also be designed by duplicating pilot tone values of the 20 MHz bandwidth. That is, a pilot sequence in the 40 MHz bandwidth (or a sequence of 16 pilot tones disposed in the 40 MHz bandwidth) may be determined as a sequence obtained by repeating a pilot sequence in the 20 MHz bandwidth (or a sequence of 8 pilot tones disposed in the 20 MHz bandwidth) twice. This may be represented by the following equation 4.

$$\psi^{NSTS,16}_{iSTS,j} = \psi^{NSTS,8}_{iSTS,mod(j,8)}$$ [Equation 4]

Here, NSTS indicates the number of streams, iSTS indicates a stream index, $\psi^{NSTS,16}_{iSTS,j}$ denotes a value of a pilot tone at a j-th position from among 16 pilot tones included in the 40 MHz bandwidth in a stream having iSTS, and $\psi^{NSTS,8}_{iSTS,mod(j,8)}$ denotes a value of a pilot tone at a mod(j,8)-th position from among 8 pilot tones included in the 20 MHz bandwidth in a stream having iSTS.

(9) Ninth Embodiment—Extended Embodiment of Fourth and Fifth Embodiments

Number of Pilot Tones

In the present embodiment, the number of pilot tones is 8. In legacy systems, the number of pilot tones used in the 40 MHz bandwidth is less than the number of pilot tones of the 80 MHz bandwidth and greater than the number of pilot tones of the 20 MHz bandwidth. Based on this, it may be desirable to use 8 or less pilot tones in the 40 MHz bandwidth if 8 pilot tones are used in the 80 MHz bandwidth in order to improve peak throughput. Further, it 8 pilot tones need to be used in the 20 MHz bandwidth in order to reuse a legacy interleaver, it may be desirable to use 8 or more pilot tones in the 40 MHz bandwidth. Accordingly, the present embodiment proposes use of 8 pilot tones in the 40 MHz bandwidth to satisfy the two conditions.

Pilot Tone Index (or Pilot Tone Position)

In the present embodiment, pilot tone indices are obtained by duplicating pilot tone indices proposed in the fourth and fifth embodiments.

Pilot tone indices generated by duplicating pilot tone indices {±11, ±39, ±75, ±103} proposed in the fourth and fifth embodiments are {(−103/−231,25), (−75/−203,53), (−39/−167,89), (−11/−139,117), (11/−117,139), (39/−89, 167), (75/−53,203), (103/−25,231), (−84/−212,44), (−28/−156,100), (28/−100,156), (84/−44,212)}.

Here, numerals at the left of "/" indicate pilot tone indices before duplication, that is, pilot tone indices {±11, ±39}, {±11, ±75}, {±11, ±103}, {±39, ±75}, {±39, ±103}, {±75, ±103}, {±28, ±84} proposed in the fourth and fifth embodiments, and numerals at the right of "/" indicate pilot tone indices after duplication, that is, pilot tone indices proposed in the present embodiment. Accordingly, if pilot tone indices {±39, ±103} proposed in the fourth embodiment are duplicated and used, indices {±25, ±89, ±167, ±231} may be generated according to the aforementioned duplication scheme and pilot tones may be positioned at such indices.

In the fourth and fifth embodiment and the present embodiment, a pilot tone index may be corrected into an even index by adding 1 thereto or subtracting 1 therefrom for application of 2×HE-LTF, as described above. For example, {±39, ±103} may be corrected into {±40, ±104} (={±(39+1), ±(103+1)}). Also, {±40, ±104} may be duplicated and corrected into {±26, ±90, ±168, ±232} (={±26, ±90, ±168, ±232}). Such duplication and correction into an even index may be equally applied to embodiments in which indices are odd numbers even though redundant description is not given.

Pilot Tone Value (Pilot Value)

In the present embodiment, pilot values conform to the scheme proposed in the first, second or third embodiment.

(3) Tenth Embodiment—Extended Embodiment of First to Third Embodiments

Number of Pilot Tones

In the present embodiment, the number of pilot tones is 8.

Pilot Tone Index (or Pilot Tone Position)

In the present embodiment, pilot tone indices are obtained by 2× upscaling pilot tone indices proposed in the first to third embodiments. Upscaled pilot tone indices may be {±22, ±78, ±150, ±206}.

Pilot Tone Value (Pilot Value)

In the present embodiment, pilot values conform to the scheme proposed in the first, second or third embodiment.

(4) Eleventh Embodiment—Embodiment of Using Only Some Pilot Positions

Number of Pilot Tones

In the present embodiment, the number of pilot tones is 8.

Pilot Tone Index (or Pilot Tone Position)

In the present embodiment, 8 pilot tone indices are selected from pilot tone indices {±25, ±53, ±89, ±117, ±139, ±167, ±203, ±231} proposed in the eighth embodiment and used.

As an embodiment, pilot tone indices may be selected from the proposed indices at intervals of two from the first index. In this case, pilot tone indices may be {−231, −167, −117, −53, +25, +89, +139, +203}.

As another embodiment, pilot tone indices may be selected from the proposed indices at intervals of two from the first index. In this case, pilot tone indices may be {−203, −139, −89, −25, +53, +117, +167, +231}.

As another embodiment, pilot tone indices may be selected such that a negative index and a positive index are symmetrical. Accordingly, pilot tone indices may be {±25, ±53, ±89, ±117}, {±25, ±53, ±89, ±139}, {±25, ±53, ±89, ±167}, {±25, ±53, ±89, ±203}, {±25, ±53, ±89, ±231}, {±25, ±53, ±117, ±139}, {±25, ±53, ±117, ±167}, {±25, ±53, ±117, ±203}, {±25, ±53, ±117, ±231}, {±25, ±53, ±139, ±167}, {±25, ±53, ±139, ±203}, {±25, ±53, ±139, ±231}, {±25, ±53, ±167, ±203}, {±25, ±53, ±167, ±231}, {±25, ±53, ±203, ±231}, {±25, ±89, ±117, ±139}, {±25, ±89, ±117, ±167}, {±25, ±89, ±117, ±203}, {±25, ±89, ±117, ±231}, {±25, ±89, ±139, ±167}, {±25, ±89, ±139, ±203}, {±25, ±89, ±139, ±231}, {±25, ±89, ±167, ±203}, {±25, ±89, ±167, ±231}, {±25, ±89, ±203, ±231}, {±25, ±117, ±139, ±167}, {±25, ±117, ±139, ±203}, {±25, ±117, ±139, ±231}, {±25, ±117, ±167, ±203}, {±25, ±117, ±167, ±231}, {±25, ±117, ±203, ±231}, {±25, ±139, ±167, ±203}, {±25, ±139, ±167, ±231}, {±25, ±139, ±203, ±231}, {±25, ±167, ±203, ±231}, {±53, ±89, ±117, ±139}, {±53, ±89, ±117, ±167}, {±53, ±89, ±117, ±203}, {±53, ±89, ±117, ±231}, {±53, ±89, ±139, ±167}, {±53, ±89, ±139, ±203}, {±53, ±89, ±139, ±231}, {±53, ±89, ±167, ±203}, {±53, ±89, ±167, ±231}, {±53, ±89, ±203, ±231}, {±53, ±117, ±139, ±167}, {±53, ±117, ±139, ±203}, {±53, ±117, ±139, ±231}, {±53, ±117, ±167, ±203}, {±53, ±117, ±167, ±231}, {±53, ±117, ±203, ±231}, {±53, ±139, ±167, ±203}, {±53, ±139, ±167, ±231}, {±53, ±139, ±203, ±231}, {±53, ±167, ±203, ±231}, {±89, ±117, ±139, ±167}, {±89, ±117, ±139, ±203}, {±89, ±117, ±139, ±231}, {±89, ±117, ±167, ±203}, {±89, ±117, ±167, ±231}, {±89, ±117, ±203, ±231}, {±89, ±139, ±167, ±203}, {±89, ±139, ±167, ±231}, {±89, ±167, ±203, ±231}, {±117, ±139, ±167, ±203}, {±117, ±139, ±167, ±231}, {±117, ±167, ±203, ±231} or {±139, ±167, ±203, ±231}.

Pilot Tone Value (Pilot Value)

In the present embodiment, pilot values conform to the scheme proposed in the first, second or third embodiment.

(5) Twelfth Embodiment—Embodiment Having the Same Number of Pilot Tones as that in 802.11ac System Number of Pilot Tones In the present embodiment, the number of pilot tones is 6 as in the 802.11ac system.

Pilot Tone Index (or Pilot Tone Position)

In the present embodiment, pilot tone indices are {±44, ±100, ±212} which are obtained by 4× upscaling pilot tone indices of the 40 MHz bandwidth in the 802.11ac system according to 512 FFT size.

Pilot Tone Value (Pilot Value)

In the present embodiment, pilot values conform to a scheme proposed in the thirty-second, thirty-third or thirty-fourth embodiment which will be described below.

(6) Thirteenth Embodiment—Embodiment of Deciding the Number of Pilot Tones Depending on the Number of Streams A scheme of applying the number of pilot tones depending on a total number of streams to increase the amount of transmitted data is proposed. The scheme proposed in the twelfth embodiment is employed when the total number of streams is less than 6, one of the schemes proposed in the ninth to eleventh embodiments is employed when the total number of streams is 6 to 8, and the scheme proposed in the eight embodiment is employed when the total number of streams is 9 to 16.

(7) Fourteenth Embodiment—Embodiment of Using the Same Pilot Sequence Irrespective of the Number of Streams The present embodiment proposes a pilot tone plan that applies one fixed pilot sequence irrespective of the number of streams as in the SSP scheme of the 802.11ac system.

Accordingly, when the number of pilot tones is 16, pilot tone indices (or positions) may conform to the scheme proposed in the eighth embodiment and pilot tone values may be obtained by duplicating pilot tone values proposed when NSTS=1 in the first embodiment twice.

When the number of pilot tones is 8, pilot tone indices may conform to the scheme proposed in the tenth embodiment and pilot tone values may conform to the scheme proposed when NSTS=1 in the first embodiment.

Further, when the number of pilot tones is 6, pilot tone indices may conform to the scheme proposed in the twelfth embodiment and pilot tone values may conform to a scheme proposed when NSTS=1 in the thirty-second embodiment which will be described below.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

3. 80 MHz: 1024 FFT

It is assumed that 1024 subcarriers (or tones) of the 80 MHz bandwidth sequentially have indices of −512 to +511.

(1) Fifteenth Embodiment—Extended Embodiment of First, Second, Third or Eighth Embodiment Number of Pilot Tones In the present embodiment, the number of pilot tones is 32.

Pilot Tone Index (or Pilot Tone Position)

In the present embodiment, pilot tone indices of the 80 MHz bandwidth may be determined by duplicating pilot tone indices of the 20 MHz bandwidth (pilot tone indices proposed in the first to third embodiments) four times. Further, pilot tone indices of the 80 MHz bandwidth may be determined by duplicating pilot tone indices of the 40 MHz bandwidth (pilot tone indices proposed in the eighth embodiment) twice. In this case, the determined pilot tone indices may be {±25, ±53, ±89, ±117, ±139, ±167, ±203, ±231, ±281, ±309, ±345, ±373, ±395, ±423, ±459, ±487}.

In this way, the scheme of duplicating a tone plan of a specific bandwidth and using the duplicated tone plan can store only one tone plan with respect to a specific bandwidth, duplicate the tone plan and use the duplicated tone plan without storing a pilot tone plan per bandwidth, simplifying system configuration.

Pilot Tone Value (Pilot Value)

Pilot tone values of the 80 MHz bandwidth may also be designed by duplicating pilot tone values of the 20 MHz bandwidth. That is, a pilot sequence in the 80 MHz bandwidth (or a sequence of 32 pilot tones disposed in the 80 MHz bandwidth) may be determined as a sequence obtained by repeating a pilot sequence in the 20 MHz bandwidth (or a sequence of 8 pilot tones disposed in the 20 MHz bandwidth) four times. This may be represented by the following equation 5.

$$\psi^{NSTS,32}_{iSTS,j} = \psi^{NSTS,8}_{iSTS,mod(j,8)} \qquad \text{[Equation 5]}$$

Here, NSTS indicates the number of streams, iSTS indicates a stream index, $\psi^{NSTS,32}_{iSTS,j}$ denotes a value of a pilot tone at a j-th position from among 32 pilot tones included in the 80 MHz bandwidth in a stream having iSTS, and $\psi^{NSTS,8}_{iSTS,mod(j,8)}$ denotes a value of a pilot tone at a mod(j,8)-th position from among 8 pilot tones included in the 20 MHz bandwidth in a stream having iSTS.

In addition, pilot tone values of the 80 MHz bandwidth may be designed by duplicating pilot tone values of the 40 MHz bandwidth. That is, a pilot sequence in the 80 MHz bandwidth (or a sequence of 32 pilot tones disposed in the 80 MHz bandwidth) may be determined as a sequence obtained by repeating a pilot sequence in the 40 MHz bandwidth (or a sequence of 16 pilot tones disposed in the 40 MHz bandwidth) twice. This may be represented by the following equation 6.

$$\psi^{NSTS,32}_{iSTS,j} = \psi^{NSTS,16}_{iSTS,mod(j,16)} \qquad \text{[Equation 6]}$$

Here, NSTS indicates the number of streams, iSTS indicates a stream index, $\psi^{NSTS,32}_{iSTS,j}$ denotes a value of a pilot tone at a j-th position from among 32 pilot tones included in the 80 MHz bandwidth in a stream having iSTS, and $\psi^{NSTS,16}_{iSTS,mod(j,8)}$ denotes a value of a pilot tone at a mod(j,16)-th position from among 16 pilot tones included in the 40 MHz bandwidth in a stream having iSTS.

(9) Sixteenth Embodiment—Extended Embodiment of Ninth to Eleventh Embodiments Number of Pilot Tones In the present embodiment, the number of pilot tones is 16. When the number of pilot tones included in the 80 MHz bandwidth is less than that included in the 40 MHz bandwidth, performance deterioration may occur. Accordingly, it is desirable to use 16 or more pilot tones in the 80 MHz bandwidth if the number of pilot tones of the 40 MHz bandwidth is fixed to 16 and it may be desirable to use 16 pilot tones in consideration of peak throughput.

Pilot Tone Index (or Pilot Tone Position)

In the present embodiment, pilot tone indices are obtained by duplicating pilot tone indices proposed in the ninth, tenth or eleventh embodiment. Duplicated pilot tone indices may be {−231/−487,25}, {−203/−459,53}, {−167/−423,89}, {−139/−395,117}, {−117/−373,139}, {−89/−345,167}, {−53/−309,203}, {−25/−281,231}, {25/−231,281}, {53/−203,309}, {89/−167,345}, {117/−139,373}, {139/−117, 395}, {167/−89,423}, {203/−53,459}, {231/−25,487}, {−212/−468,44}, {−156/−412,100}, {−100/−356,156}, {−44/−300,212}, {44/−212,300}, {100/−156,356}, {156/−100,412}, {212/−44,468}, {−206/−462,50}, {−150/−406, 106}, {−78/−334,178}, {−22/−278,234}, {22/−234,278}, {78/−178,334}, {150/−106,406}, or {206/−50,462}.

Here, numerals at the left of "/" indicate pilot tone indices before duplication, that is, pilot tone indices proposed in the ninth, tenth or eleventh embodiment, and numerals at the right of "/" indicate pilot tone indices after duplication, that is, pilot tone indices proposed in the present embodiment.

Pilot Tone Value (Pilot Value)

In the present embodiment, pilot values conform to the scheme proposed in the eighth embodiment.

(3) Seventeenth Embodiment—Embodiment of Upscaling Eighth Embodiment

Number of Pilot Tones

In the present embodiment, the number of pilot tones is 16.

Pilot Tone Index (or Pilot Tone Position)

In the present embodiment, pilot tone indices are obtained by 2× upscaling pilot tone indices proposed in the eighth embodiment. Upscaled pilot tone indices may be {±50, ±106, ±178, ±234, ±278, ±334, ±406, ±462}.

Pilot Tone Value (Pilot Value)

In the present embodiment, pilot values conform to the scheme proposed in the eighth embodiment.

(4) Eighteenth Embodiment—Embodiment of Using Only Some Pilot Positions

Number of Pilot Tones

In the present embodiment, the number of pilot tones is 16.

Pilot Tone Index (or Pilot Tone Position)

In the present embodiment, 16 pilot tone indices are selected from pilot tone indices {±25, ±53, ±89, ±117, ±139, ±167, ±203, ±231, ±281, ±309, ±345, ±373, ±395, ±423, ±459, ±487} proposed in the fifteenth embodiment and used.

As an embodiment, pilot tone indices may be selected from the proposed indices at intervals of two from the first index. In this case, pilot tone indices may be {−487, −423, −373, −309, −231, −167, −117, −53, +25, +89, +139, +203, +281, +345, +395, +459}.

As another embodiment, pilot tone indices may be selected from the proposed indices at intervals of two from the first index. In this case, pilot tone indices may be {−459, −395, −345, −281, −203, −139, −89, −25, +53, +117, +167, +231, +309, +373, +423, +487}.

As another embodiment, pilot tone indices may be selected such that a negative index and a positive index are symmetrical. Accordingly, pilot tone indices may be {±25, ±89, ±139, ±203, ±281, ±345, ±395, ±459}, or {±53, ±117, ±167, ±231, ±309, ±373, ±423, ±487}.

Pilot Tone Value (Pilot Value)

In the present embodiment, pilot values conform to the scheme proposed in the eighth embodiment.

(5) Nineteenth Embodiment—Embodiment Related to Equidistance and Symmetrical Pilot Tone Plan Number of Pilot Tones In the present embodiment, the number of pilot tones is 16.

Pilot Tone Index

In the present embodiment, pilot tone indices have an equidistance and indices of pilot tone positions that satisfy symmetry may be {±33, ±95, ±157, ±219, ±281, ±343, ±405, ±467}, {±34, ±96, ±158, ±220, ±282, ±344, ±406, ±468}, 또는 {±35, ±97, ±159, ±221, ±283, ±345, ±407, ±469}.

When an equidistance and symmetry are satisfied between pilot tones as in the present embodiment, CFO (Carrier Frequency Offset) performance is improved.

Pilot Tone Value (Pilot Value)

Pilot tone values in the present embodiment may be applied to embodiments in the specification in various manners.

(6) Twentieth Embodiment—Embodiment Having the Same Number of Pilot Tones as that in 802.11ac System Number of Pilot Tones In the present embodiment, the number of pilot tones is 8 as in the 802.11 ac system.

Pilot Tone Index (or Pilot Tone Position)

In the present embodiment, pilot tone indices are obtained by 4× upscaling pilot tone indices of the 80 MHz bandwidth of the 802.11ac system in consideration of 1024 FFT size. 4× upscaled pilot tone indices may be {±44, ±156, ±300, ±412}.

4× upscaling and use of pilot indices of a legacy system in consideration of the 802.11ac system and the 802.11ax system may be advantageous for system compatibility and hardware implementation.

Pilot Tone Value (Pilot Value)

In the present embodiment, pilot values conform to a scheme proposed in the first, second or third embodiment.

(7) Twenty-First Embodiment—Embodiment of Deciding the Number of Pilot Tones Depending on Number of Streams A scheme of applying the number of pilot tones depending on a total number of streams to increase the amount of transmitted data is proposed. The scheme proposed in the nineteenth embodiment is employed when the total number of streams is less than 8, one of the schemes proposed in the sixteenth to eighteenth embodiments is employed when the total number of streams is 9 to 16, and the schemes proposed in the fifteenth embodiment are employed when the total number of streams is 17 to 32.

(8) Twenty-Second Embodiment—Embodiment of Using the Same Pilot Sequence Irrespective of the Number of Streams The present embodiment proposes a pilot tone plan that applies one fixed pilot sequence irrespective of the number of streams as in the SSP scheme of the 802.11ac system.

Accordingly, when the number of pilot tones is 32, pilot tone indices (or positions) may conform to the scheme proposed in the fifteenth embodiment and pilot tone values may be obtained by duplicating pilot tone values (or pilot sequence) proposed when the number of pilot tones is 16 in the fourteenth embodiment two times.

When the number of pilot tones is 16, pilot tone indices may conform to the scheme proposed in the seventeenth embodiment and pilot tone values may conform to the scheme proposed when the number of pilot tones is 16 in the fourteenth embodiment.

Further, when the number of pilot tones is 8, pilot tone indices may conform to the scheme proposed in the nineteenth embodiment and pilot tone values may conform to the scheme proposed when NSTS=1 in the first embodiment.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

4. 160 MHz: 2048 FFT

It is assumed that 1024 subcarriers (or tones) of the 80 MHz bandwidth sequentially have indices of −1024 to +1023.

(1) Twenty-Third Embodiment—Extended Embodiment of Fifteenth to Eighteenth Embodiments or Twentieth Embodiment In the present embodiment, pilot tone numbers/indexes/values proposed in the fifteenth to eighteen embodiments or the twentieth embodiment are duplicated twice and used. Hereinafter, duplicated pilot tone indices according to embodiments will be described. In the following, numerals at the left of "/" indicate pilot tone indices before duplication and numerals at the right of "/" indicate pilot tone indices after duplication, that is, pilot tone indices proposed in the present embodiment.

In the Case of the Fifteenth Embodiment (64(=2*32) Pilot Tones)

{−487:−999,25}, {−459:−971,53}, {−423:−935,89}, {−395:−907,117}, {−373:−885,139}, {−345:−857,167}, {−309:−821,203}, {−281:−793,231}, {−231:−743,281}, {−203:−715,309}, {−167:−679,345}, {−139:−651,373}, {−117:−629,395}, {−89:−601,420}, {−53:−565,459}, {−25:−537,487}, {25:−487,537}, {53:−459,565}, {89:−420,601}, {117:−395,629}, {139:−373,651}, {167:−345,679}, {203:−309,715}, {231:−281,743}, {281:−231,793}, {309:−203,821}, {345:−167,857}, {373:−139,885}, {395:−117,907}, {423:−89,935}, {459:−53,971}, {487:−25,999}

In the Case of the Sixteenth Embodiment (32(=2*16) Pilot Tones)

{−487:−999,25}, {−459:−971,53}, {−423:−935,89}, {−395:−907,117}, {−373:−885,139}, {−345:−857,167}, {−309:−821,203}, {−281:−793,231}, {−231:−743,281}, {−203:−715,309}, {−167:−679,345}, {−139:−651,373}, {−117:−629,395}, {−89:−601,420}, {−53:−565,459}, {−25:−537,487}, {25:−487,537}, {53:−459,565}, {89:−420,601}, {117:−395,629}, {139:−373,651}, {167:−345,679}, {203:−309,715}, {231:−281,743}, {281:−231,793}, {309:−203,821}, {345:−167,857}, {373:−139,885}, {395:−117,907}, {423:−89,935}, {459:−53,971}, {487:−25,999}, {−468:−980,44}, {−412:−924,100}, {−356:−868,156}, {−300:−812,212}, {−212:−724,300}, {−156:−668,356}, {−100:−612,412}, {−44:−556,468}, {44:−468,556}, {100:−412,612}, {156:−356,668}, {212:−300,724}, {300:−212,812}, {356:−156,868}, {412:−100,924}, {468:−44,980}, {−462:−974,50}, {−406:−918,106}, {−334:−846,178}, {−278:−790,234}, {−234:−746,278}, {−178:−690,334}, {−106:−618,406}, {−50:−562,462}, {50:−462,562}, {106:−406,618}, {178:−334,690}, {234:−278,746}, {278:−234,790}, {334:−178,846}, {406:−106,918}, {462:−50,974}

In the Case of the Seventeenth Embodiment (32(=2*16) Pilot Tones)

{−462:−974,50}, {−406:−918,106}, {−334:−846,178}, {−278:−790,234}, {−234:−746,278}, {−178:−690,334}, {−106:−618,406}, {−50:−562,462}, {50:−462,562}, {106:−406,618}, {178:−334,690}, {234:−278,746}, {278:−234,790}, {334:−178,846}, {406:−106,918}, {462:−50,974}

In the Case of the Eighteenth Embodiment (32(=2*16) Pilot Tones)

{−487:−999,25}, {−459:−971,53}, {−423:−935,89}, {−395:−907,117}, {−373:−885,139}, {−345:−857,167}, {−309:−821,203}, {−281:−793,231}, {−231:−743,281}, {−203:−715,309}, {−167:−679,345}, {−139:−651,373}, {−117:−629,395}, {−89:−601,420}, {−53:−565,459}, {−25:−537,487}, {25:−487,537}, {53:−459,565}, {89:−420,601}, {117:−395,629}, {139:−373,651}, {167:−345,679}, {203:−309,715}, {231:−281,743}, {281:−231,793}, {309:−203,821}, {345:−167,857}, {373:−139,885}, {395:−117,907}, {423:−89,935}, {459:−53,971}, {487:−25,999}

In the Case of the Twentieth Embodiment (16(=2*8) Pilot Tones)

{−412:−924,100}, {−300:−812,212}, {−156:−668,356}, {−44:−556,468}, {44:−468,556}, {156:−356,668}, {300:−212,812}, {412:−100,924}

(2) Twenty-Fourth Embodiment—Embodiment of Deciding the Number of Pilot Tones Depending on Number of Streams A scheme of applying the number of pilot tones depending on a total number of streams to increase the amount of transmitted data is proposed. The nineteenth embodiment is duplicated and used when the total number of streams is less than 16, one of the sixteenth to eighteenth embodiments is duplicated and used when the total number of streams is 17 to 32, and the scheme proposed in the fifteenth embodiment is employed when the total number of streams is 32 to 64.

(3) Twenty-Fifth Embodiment—Embodiment of Using the Same Pilot Sequence Irrespective of Number of Streams The present embodiment proposes a pilot tone plan that applies one fixed pilot sequence irrespective of the number of streams as in the SSP scheme of the 802.11ac system. Accordingly, pilot tone number/index/value proposed in the twenty-second embodiment are duplicated twice and used in the present embodiment.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

Pilot tone plans applicable to non-OFDMA transmission have been described. The above-described embodiments are applicable to pilot tones of HE-LTF and HE-data part in DL/UL and SU/MU transmission situations and the aforementioned pilot tones may be used for tracking phases and CFO of HE-LTF and HE-data part.

B. OFDMA Transmission

In the OFDMA transmission scheme newly introduced into the 802.11ax system, subcarriers are divided into resource units in units of predetermined tones, as described above with reference to FIGS. 15 to 17. A detailed description will be given of a pilot tone plan per resource unit.

1. 26-Tone Resource Unit

It is assumed that subcarriers (or tones) included in a 26-tone resource unit sequentially have indices of 0 to 25. The 26-tone resource unit may include 2 pilot tones. Hereinafter, indices and values of the 2 pilot tones will be described in embodiments.

(1) Twenty-Sixth Embodiment

Pilot Tone Index (or Pilot Tone Position)

As an embodiment, when the 26-tone resource unit is divided into two parts, the 2 pilot tones may be respectively positioned at the centers of the parts. In this case, accordingly, indices of the pilot tones may be {6, 19}.

As another embodiment, the 2 pilot tones may be positioned at indices which have been corrected in consideration of pilot tone spacing by excluding DC tones and guard tones in 1 MHz 32 FFT in the 802.11ah system. In this case, indices of the pilot tones may be {6, 19}.

As another embodiment, the 2 pilot tones may be spaced by a distance between pilot tones included in 1 MHz 32 FFT in the 802.11ah system. More specifically, pilot tones are positioned at indices of −7 and +7 in 1 MHz 32 FFT in the 802.11ah system, and thus the 2 pilot tones are spaced by 14. Accordingly, in consideration of such spacing and symmetry, pilot tones of the present embodiment may be determined as {5, 19} or {6, 20}.

Pilot Tone Value (Pilot Value)

FIGS. 24 and 25 are tables showing pilot tone values depending on number of streams according to an embodiment of the present invention. In the present embodiment, pilot tone values may be determined according to the MSP scheme as shown in the tables of FIGS. 24 and 25. Particularly, pilot tone values may be determined as shown in the table of FIG. 24 (FIG. 24(a) or FIG. 24(b)) when NSTS is 1 and pilot tone values may be determined as shown in the table of FIG. 25 (FIG. 25(a), FIG. 25(b) or FIG. 25(c)) when NSTS is 2. In the tables of FIGS. 24 and 25, iSTS denotes a stream index and $\psi^{NSTS,2}_{iSTS,j}$ denotes a value of a pilot tone at a j-th position from among 2 pilot tones in a stream having iSTS.

In FIG. 25, i is 1 or 2, and ic is 2 when i=1 and 1 when i=2. Although not shown in FIG. 25, ic may have {−1, −1} in addition to {1, 1} as a sequence. While the pilot tone values shown in the tables of FIGS. 25(a) and 25(b) have orthogonality for each stream, a PAPR problem may be generated when iSTS=ic. To solve such a PAPR problem, pilot tone values that satisfy non-orthogonality per stream, as shown in FIG. 25(c), may be proposed.

(2) Twenty-Seventh Embodiment

Pilot Tone Index

In the present embodiment, pilot tone indices conform to the scheme proposed in the twenty-sixth embodiment.

Pilot Tone Value (Pilot Value)

The present embodiment proposes a pilot tone plan that applies one fixed pilot sequence irrespective of the number of streams as in the SSP scheme of the 802.11ac system. Accordingly, pilot tone values may conform to the scheme proposed when NSTS=1 in the twenty-sixth embodiment.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

2. 52-Tone Resource Unit

It is assumed that subcarriers (or tones) included in a 52-tone resource unit sequentially have indices of 0 to 51. The 52-tone resource unit may include 4 pilot tones. Hereinafter, indices and values of the 4 pilot tones will be described in embodiments.

(1) Twenty-Eighth Embodiment

Pilot Tone Index (or Pilot Tone Position)

As an embodiment, when the 52-tone resource unit is divided into four parts, the 4 pilot tones may be respectively positioned at the centers of the parts. In this case, accordingly, indices of the pilot tones may be {6, 19, 32, 45}.

As another embodiment, the 4 pilot tones may be positioned at indices which have been corrected in consideration of pilot tone spacing by excluding DC tones and guard tones in the 20 MHz bandwidth of the 802.11n or 802.11ac system. In this case, accordingly, indices of the pilot tones may be {5, 19, 32, 46}.

As another embodiment, the 4 pilot tones may be spaced by a distance between pilot tones included in the 20 MHz bandwidth of the 802.11n or 802.11ac system. More specifically, since pilot tones are positioned at indices of −21, −7, +7 and +21 in the 20 MHz bandwidth of the 802.11n or 802.11ac system, the 4 pilot tones are spaced by 14. Accordingly, in consideration of such spacing and symmetry, pilot tones of the present embodiment may be determined as {7, 21, 35, 49} or {6, 20, 34, 48}.

Pilot Tone Value (Pilot Value)

FIGS. 26 and 27 are tables showing pilot tone values depending on number of streams according to an embodiment of the present invention. Pilot values of the 20 MHz bandwidth of the 802.11n system, which are shown in FIGS. 26 and 27, may be reused in the present embodiment. In FIGS. 26 and 27, NSTS denotes the number of streams, iSTS denotes a stream index and $\psi^{NSTS,4}_{iSTS,j}$ denotes a value of a pilot tone at a j-th position from among 4 pilot tones in a stream having iSTS.

(2) Twenty-Ninth Embodiment

Pilot Tone Index (or Pilot Tone Position)

In the present embodiment, pilot tone indices conform to the scheme proposed in the twenty-eighth embodiment.

Pilot Tone Value (Pilot Value)

In the present embodiment, pilot tone values may be determined using pilot values proposed when NSTS=4 in the twenty-eighth embodiment. Accordingly, pilot tones of the first stream (iSTS=1) may have a pilot sequence of $\{1, 1, 1, -1\}$, pilot tones of the second stream (iSTS=2) may have a pilot sequence of $\{1, 1, -1, 1\}$, pilot tones of the third stream (iSTS=3) may have a pilot sequence of $\{1, -1, 1, 1\}$, and pilot tones of the fourth stream (iSTS=4) may have a pilot sequence of $\{-1, 1, 1, 1\}$ in the present embodiment.

(3) Thirtieth Embodiment

Pilot Tone Index (or Pilot Tone Position)

In the present embodiment, pilot tone indices conform to the scheme proposed in the twenty-eighth embodiment.

Pilot Tone Value (Pilot Value)

FIG. 28 is a table showing sequence groups for generating pilot values according to an embodiment of the present invention.

In the present embodiment, pilot tone values may be determined as a pilot sequence generated by combining sequences of groups A and B shown in FIG. 28. For example, a pilot sequence of $\{1, 1, -1, -1\}$ or $\{-1, -1, 1, 1\}$ may be generated using a sequence with index 1 of the group A and a sequence with index 1 of the group B. One pilot sequence generated in this way may be equally applied to pilot tones transmitted through streams irrespective of the number of streams.

(4) Thirty-First Embodiment

Pilot Tone Index (or Pilot Tone Position)

In the present embodiment, pilot tone indices conform to the scheme proposed in the twenty-eighth embodiment.

Pilot Tone Value (Pilot Value)

The present embodiment proposes a pilot tone plan that applies one fixed pilot sequence irrespective of the number of streams as in the SSP scheme of the 802.11ac system. Here, pilot tone values may conform to the scheme proposed when NSTS=1 in the twenty-eighth embodiment.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

3. 106-Tone Resource Unit

It is assumed that subcarriers (or tones) included in a 106-tone resource unit sequentially have indices of 0 to 105.

(1) Thirty-Second Embodiment

Number of Pilot Tones

In the present embodiment, the number of pilot tones is 6.

Pilot Tone Index (or Pilot Tone Position)

As an embodiment, when the 106-tone resource unit is divided into six parts, 6 pilot tones may be respectively positioned at the centers of the parts. If 2 tones can be positioned at the center of a divided part because the part is composed of an even number of tones, a pilot tone may be disposed at one of the 2 tones.

As another embodiment, the 6 pilot tones may be positioned at corrected indices except DC tones and guard tones from among pilot tone indices in the 40 MHz bandwidth of the 802.11n or 802.11ac system. In this case, indices of the pilot tones may be $\{1, 29, 43, 62, 76, 104\}$.

Pilot Tone Value (Pilot Value)

FIGS. 29 and 30 are tables showing pilot tone values depending on number of streams according to an embodiment of the present invention. Pilot values of the 40 MHz bandwidth of the 802.11n system, which are shown in FIGS. 29 and 30, may be reused in the present embodiment. In FIGS. 29 and 30, NSTS denotes the number of streams, iSTS denotes a stream index and $\psi^{NSTS,6}_{iSTS,j}$ denotes a value of a pilot tone at a j-th position from among 6 pilot tones in a stream having iSTS.

(2) Thirty-Third Embodiment

Pilot Tone Number/Index

In the present embodiment, pilot tone number and indices conform to the scheme proposed in the thirty-second embodiment.

Pilot Tone Value (Pilot Value)

In the present embodiment, pilot tone values may be determined by extending pilot values proposed when NSTS=4 in the thirty-second embodiment in first to fourth streams. Accordingly, pilot tones of the first stream (iSTS=1) may have a pilot sequence of $\{1, 1, -1, -1, -1, -1\}$, pilot tones of the second stream (iSTS=2) may have a pilot sequence of $\{1, 1, 1, -1, 1, 1\}$, pilot tones of the third stream (iSTS=3) may have a pilot sequence of $\{1, -1, 1, -1, -1, 1\}$ and pilot tones of the fourth stream (iSTS=4) may have a pilot sequence of $\{-1, 1, 1, 1, -1, 1\}$ in the present embodiment.

(3) Thirty-Fourth Embodiment

Pilot Tone Number/Index

In the present embodiment, pilot tone number and indices conform to the scheme proposed in the thirty-second embodiment.

Pilot Tone Value (Pilot Value)

FIG. 31 is a table showing sequence groups for generating pilot values according to an embodiment of the present invention.

In the present embodiment, pilot tone values may be determined depending on a pilot sequence generated by combining sequences of groups A, B and C. For example, a pilot sequence of $\{1\ 1\ -1\ -1\ 1\ -1\}$ may be generated by combining a sequence with index 1 of the group A, a sequence with index 2 of the group B and a sequence with index 3 of the group C. Here, a sequence composed of only sequences with index 1 or 2 μs excluded in consideration of a PAPR problem. That is, $\{1\ 1\ 1\ 1\ 1\ 1\}$ and $\{-1\ -1\ -1\ -1\ -1\ -1\}$ are not used as pilot sequences in the present embodiment.

One pilot sequence generated in this way may be equally applied to pilot tones transmitted through streams irrespective of the number of streams.

(4) Thirty-Fifth Embodiment

Pilot Tone Index (or Pilot Tone Position)

In the present embodiment, pilot tone indices conform to the scheme proposed in the thirty-second embodiment.

Pilot Tone Value (Pilot Value)

The present embodiment may propose a pilot tone plan that applies one fixed pilot sequence irrespective of the number of streams as in the SSP scheme of the 802.11ac system. Here, pilot tone values may conform to the scheme proposed when NSTS=1 in the thirty-second embodiment.

This pilot tone plan is proposed because overhead for using a plurality of orthogonal pilot sequences in a MIMO situation in which data is transmitted and received using multiple streams is large compared to performance obtained by using the orthogonal pilot sequences. Accordingly, overhead can be reduced by introducing the SSP scheme that applies a fixed pilot sequence irrespective of the number of streams.

When 4 pilot tones are used for a 106-tone resource unit, there is an advantage that an interleaver used in the 40 MHz bandwidth of legacy systems can be reused. Hereinafter, embodiments in which a 106-tone resource unit includes 4 pilot tones will be described. Particularly, embodiments based on "indices (or positions) of pilot tones" will be described below. Pilot tone indices may be determined in consideration of an equidistance and symmetry between pilot tones and pilot tone values conform to the scheme proposed in the twenty-eighth, twenty-ninth or thirtieth embodiment. Hereinafter, it is assumed that a 106-tone resource unit includes 4 26-tone resource units and 2 leftover tones.

(5) Thirty-Sixth Embodiment

When leftover tones are positioned at both sides of a 106-tone resource unit, indices of the 106-tone resource unit may be divided into 4 parts of i) 0 to 26 (27 tones), ii) 27 to 52 (26 tones), iii) 53 to 78 (26 tones) and iv) 79 to 105 (27 tones). Here, pilot indices of {13, 39, 65, 92}, {13, 40, 66, 92}, {13, 39, 66, 92} or {13, 40, 65, 92} may be proposed.

Further, when the indices are divided into 4 parts each having 26 tones (i) 1 to 26 (26 tones), ii) 27 to 52 (26 tones), iii) 52 to 78 (26 tones) and iv) 79 to 104 (26 tones)) except the tones positioned at the indices 0 and 105 on both sides of the 106-tone resource unit, pilot indices of {13, 39, 65, 91} or {14, 40, 66, 92} may be proposed.

(6) Thirty-Seventh Embodiment

When leftover tones are positioned at the center of a 106-tone resource unit, indices of the 106-tone resource unit may be divided into 4 parts of i) 0 to 25 (26 tones), ii) 26 to 52 (27 tones), iii) 53 to 79 (27 tones) and iv) 80 to 105 (26 tones). Here, pilot indices of {12, 39, 66, 92}, {13, 39, 66, 93}, {12, 39, 66, 93} or {12, 39, 66, 92} may be proposed.

Further, when the indices are divided into 4 parts each having 26 tones (i) 0 to 25 (26 tones), ii) 26 to 51 (26 tones), iii) 54 to 79 (26 tones) and iv) 80 to 105 (26 tones)) except tones positioned at the center indices 52 and 53 of the 106-tone resource unit, pilot indices of {12, 38, 66, 92} or {13, 39, 67, 93} may be proposed.

(7) Thirty-Eighth Embodiment

When leftover tones are positioned at the left of a 106-tone resource unit, indices of the 106-tone resource unit may be divided into 4 parts of i) 0 to 27 (28 tones), ii) 28 to 53 (26 tones), iii) 54 to 79 (26 tones) and iv) 80 to 105 (26 tones). Here, pilot indices of {13, 40, 66, 92}, {14, 40, 66, 92}, {13, 41, 67, 93} or {14, 41, 67, 93} may be proposed.

Further, when the indices are divided into 4 parts each having 26 tones (i) 2 to 27 (26 tones), ii) 28 to 53 (26 tones), iii) 54 to 79 (26 tones) and iv) 80 to 105 (26 tones)) except tones positioned at the indices 0 and 1 at the left of the 106-tone resource unit, pilot indices of {14, 40, 66, 92} or {15, 41, 67, 93} may be proposed.

(8) Thirty-Ninth Embodiment

When leftover tones are positioned at the right of a 106-tone resource unit, indices of the 106-tone resource unit may be divided into 4 parts of i) 0 to 25 (26 tones), ii) 26 to 51 (26 tones), iii) 52 to 77 (26 tones) and iv) 78 to 105 (28 tones). Here, pilot indices of {12, 38, 64, 91}, {12, 38, 64, 92}, {13, 39, 65, 91} or {13, 39, 65, 92} may be proposed.

Further, when the indices are divided into 4 parts each having 26 tones (i) 0 to 25 (26 tones), ii) 26 to 51 (26 tones), iii) 52 to 77 (26 tones) and iv) 78 to 103 (26 tones)) except tones positioned at the indices 104 and 105 at the right of the 106-tone resource unit, pilot indices of {12, 38, 64, 90} or {13, 39, 65, 91} may be proposed.

Embodiments of dividing a 106-tone resource unit into 4 parts and deciding one of tones included in each part as a pilot tone have been described in detail. Hereinafter, embodiments of using 4 pilot indices of a 26-tone or 52-tone resource unit at a position corresponding to a 106-tone resource unit as pilot tone indices of the 106-tone resource unit will be described. Here, the 26-tone or 52-tone resource unit at a position corresponding to a 106-tone resource unit refers to a 26-tone or 52-tone resource unit positioned at the same indices as the 106-tone resource unit within the same bandwidth. Otherwise, the 26-tone or 52-tone resource unit at a position corresponding to a 106-tone resource unit refers to a 26-tone or 52-tone resource unit included in the 106-tone resource unit.

(9) Fortieth Embodiment

FIG. 32 is a diagram illustrating positions of pilot tones included in a 106-tone resource unit.

When 2 leftover tones are positioned at the center of the 106-tone resource unit in order to maintain symmetry, positions of 4 pilot tones (referred to hereinafter as first to fourth pilot tones) included in the 106-tone resource unit may be the same as positions of 4 pilot tones from among 8 pilot tones included in 4 26-tone resource units at positions corresponding to the 106-tone resource unit. In this case, the 4 26-tone resource units and 2 leftover tones are disposed at positions corresponding to the 106-tone resource unit, and the 2 leftover tones may be positioned at the center of the 4 26-tone resource units which are sequentially arranged. More specifically, when the sequentially arranged 4 26-tone resource units are referred to as first to fourth 26-tone resource units, the 2 leftover tones may be positioned between the second and third 26-tone resource units.

Here, the position of each of the first to fourth pilot tones may be the same as the position of one of 2 pilot tones included in each of the 4 26-tone resource units. For example, the position of the first pilot tone may correspond to the position of one of the 2 pilot tones included in the first 26-tone resource unit, the position of the second pilot tone may correspond to the position of one of the 2 pilot tones included in the second 26-tone resource unit, the position of the third pilot tone may correspond to the position of one of the 2 pilot tones included in the third 26-tone resource unit, and the position of the fourth pilot tone may correspond to the position of one of the 2 pilot tones included in the fourth 26-tone resource unit.

Here, the position of each of the first to fourth pilot tones may be the same as the position of one of the 2 pilot tones included in each of the 4 26-tone resource units, which is a longer distance from the leftover tones. For example, the position of the first pilot tone may correspond to the position of one of the 2 pilot tones included in the first 26-tone resource unit, which is a longer distance from the leftover tones, the position of the second pilot tone may correspond to the position of one of the 2 pilot tones included in the second 26-tone resource unit, which is a longer distance from the leftover tones, the position of the third pilot tone may correspond to the position of one of the 2 pilot tones included in the third 26-tone resource unit, which is a longer distance from the leftover tones, and the position of the fourth pilot tone may correspond to the position of one of the 2 pilot tones included in the fourth 26-tone resource unit, which is a longer distance from the leftover tones. If each of the 4 26-tone resource units at positions corresponding to the 106-tone resource unit is composed of 26 tones respectively having indices of 0 to 25 and includes pilot tones corresponding to indices of {6, 20}, pilot tone index candidates to be applied to the 106-tone resource unit may be {6, 20, 32, 46, 60, 74, 86, 100}. When pilot tones at a longer distance from the leftover tones are selected from the pilot tone index candidates in consideration of symmetry, the selected pilot tones may be {6, 32, 74, 100} (refer to 32).

Further, the position of each of the first to fourth pilot tones may be the same as the position of one of the 2 pilot tones included in each of the 4 26-tone resource units, which is a shorter distance from the leftover tones. For example, the position of the first pilot tone may correspond to the position of one of the 2 pilot tones included in the first 26-tone resource unit, which is a shorter distance from the leftover tones, the position of the second pilot tone may correspond to the position of one of the 2 pilot tones included in the second 26-tone resource unit, which is a shorter distance from the leftover tones, the position of the third pilot tone may correspond to the position of one of the 2 pilot tones included in the third 26-tone resource unit, which is a shorter distance from the leftover tones, and the position of the fourth pilot tone may correspond to the position of one of the 2 pilot tones included in the fourth 26-tone resource unit, which is a shorter distance from the leftover tones. If each of the 4 26-tone resource units at positions corresponding to the 106-tone resource unit is composed of 26 tones respectively having indices of 0 to 25 and includes pilot tones corresponding to indices of {6, 20}, pilot tone index candidates to be applied to the 106-tone resource unit may be {6, 20, 32, 46, 60, 74, 86, 100}. When pilot tones at a shorter distance from the leftover tones are selected from the pilot tone index candidates in consideration of symmetry, the selected pilot tones may be {20, 46, 60, 86}.

Further, when each of the 4 26-tone resource units at positions corresponding to the 106-tone resource unit is composed of 26 tones respectively having indices of 0 to 25 and includes pilot tones corresponding to indices of {6, 19}, pilot tone index candidates to be applied to the 106-tone resource unit may be {6, 19, 32, 45, 60, 73, 86, 99}. When 4 indices are determined from among the pilot tone index candidates in consideration of symmetry, the determined indices may be {6, 32, 73, 99} or {19, 45, 60, 86}.

Further, when each of the 4 26-tone resource units at positions corresponding to the 106-tone resource unit is composed of 26 tones respectively having indices of 0 to 25 and includes pilot tones corresponding to indices of {5, 19}, pilot tone index candidates to be applied to the 106-tone resource unit may be {5, 19, 31, 45, 59, 73, 85, 99}. When 4 indices are determined from among the pilot tone index candidates in consideration of symmetry, the determined indices may be {5, 31, 73, 99} or {19, 45, 59, 85}.

Based on the above description, the positions of the 4 pilot tones (first to fourth pilot tones) included in the 106-tone resource unit may be the same as positions of 4 pilot tones from among 8 pilot tones included in 2 52-tone resource units at positions corresponding to the 106-tone resource unit. Here, the 2 52-tone resource units and 2 leftover tones are disposed at positions corresponding to the 106-tone resource unit, and the 2 leftover tones may be positioned at the center of (or between) the 2 52-tone resource units which are sequentially arranged.

In this case, the positions of the first to fourth pilot tones may correspond to positions of two of 4 pilot tones included in each of the 2 52-tone resource units, as in the above case.

When pilot indices of a smaller resource unit constituting a 106-tone resource unit are used, system configuration is simplified to reduce hardware burden.

(10) Forty-First Embodiment

When one leftover tone is positioned at both sides of a 106-tone resource unit in order to meet symmetry, 4 pilot tone indices of 4 26-tone resource units at positions corresponding to the 106-tone resource unit may be used as pilot tone indices of the present embodiment.

If each 26-tone resource unit is composed of 26 tones respectively having indices of 0 to 25 and pilot tones are positioned at indices of {6, 19}, pilot tone index candidates to be applied to the 106-tone resource unit may be {7, 20, 33, 46, 59, 72, 85, 98}. When 4 indices are determined from among the pilot tone index candidates in consideration of symmetry, the determined indices may be {7, 33, 72, 98} or {20, 46, 59, 85}.

Further, when each 26-tone resource unit is composed of 26 tones respectively having indices of 0 to 25 and pilot tones are positioned at indices of {5, 19}, pilot tone index candidates to be applied to the 106-tone resource unit may be {6, 20, 32, 46, 58, 72, 84, 98}. When 4 indices are determined from among the pilot tone index candidates in consideration of symmetry, the determined indices may be {6, 32, 72, 98} or {20, 46, 58, 84}.

Further, when each 26-tone resource unit is composed of 26 tones respectively having indices of 0 to 25 and pilot tones are positioned at indices of {6, 20}, pilot tone index candidates to be applied to the 106-tone resource unit may be {7, 21, 33, 47, 59, 73, 85, 99}. When 4 indices are determined from among the pilot tone index candidates in consideration of symmetry, the determined indices may be {7, 33, 73, 99} or {21, 47, 59, 85}.

It may be possible to decide 4 indices from among the pilot tone index candidates without considering symmetry. When pilot tones included in 2 52-tone resource units at positions corresponding to the 106-tone resource unit are used, 4 pilot tone indices of the 52-tone resource units may be used as pilot tone indices of the 106-tone resource unit similarly to the above-described case. System configuration is simplified by selectively using pilot tones of a resource unit in units of a smaller tone as in the above-described embodiments.

(11) Forty-Second Embodiment

The present embodiment proposes use of a leftover tone as a pilot tone.

When leftover tones are positioned at the left end (e.g., indices of {0, 1}) of a 106-tone resource unit, pilot tone indices of the 106-tone resource unit may be {0, 1, 104, 105} in consideration of symmetry. This may be equally applied when leftover tones are positioned at the right end (e.g., indices of {104, 105}).

When only some of the leftover tones are used as pilot tones and symmetry and equidistance of pilot tones are considered, pilot tone indices of the 106-tone resource unit may be determined as {0, 26, 79, 105}, {0, 27, 78, 105} or {1, 27, 78, 104}.

When leftover tones are positioned at the center (e.g., indices of {52, 53}) of the 106-tone resource unit, pilot tone indices of the 106-tone resource unit may be determined as {26, 52, 53, 79} in consideration of symmetry and equidistance.

4. 242-Tone Resource Unit

It is assumed that subcarriers (or tones) included in a 242-tone resource unit sequentially have indices of 0 to 241. The number and values of pilot tones included in the 242-tone resource unit conform to the scheme proposed in the first to seventh embodiments. A description will be given on the basis of pilot tone indices included in the 242-tone resource unit.

(1) Forty-Third Embodiment

In the present embodiment, when the 242-tone resource unit is divided by the number of pilot tones, pilot tones may be positioned at the centers of divided parts. For example, when the 242-tone resource unit includes 8 pilot tones, the 242-tone resource unit may be divided into 8 parts and the 8 pilot tones may be positioned at the centers of the parts. If 2 tones are positioned at the center of each part because each part is composed of an even number of tones, a pilot tone may correspond to one of the 2 tones.

For example, indices of the 242-tone resource unit may be divided into 8 parts of i) 0 to 30 (31 tones), ii) 31 to 60 (30 tones), iii) 61 to 90 (30 tones), iv) 91 to 120 (30 tones), v) 121 to 150 (30 tones), vi) 151 to 180 (30 tones), vii) 181 to 210 (30 tones), and viii) 211 to 241 (31 tones). In this case, pilot ton indices may be {15, 45, 75, 105, 136, 166, 196, 226}.

If the 242-tone resource unit is divided into 8 parts each of which includes 30 tones, except tones positioned at both sides thereof (indices of {0, 241}) (indices being i) 1 to 30 (30 tones), ii) 31 to 60 (30 tones), iii) 61 to 90 (30 tones), iv) 91 to 120 (30 tones), v) 121 to 150 (30 tones), vi) 151 to 180 (30 tones), vii) 181 to 210 (30 tones), viii) 211 to 240 (30 tones)), pilot tone indices may be {15, 45, 75, 105, 135, 165, 195, 225} or {16, 46, 76, 106, 136, 166, 196, 226}.

Further, indices of the 242-tone resource unit may be divided into 8 parts of i) 0 to 29 (30 tones), ii) 30 to 59 (30 tones), iii) 60 to 89 (30 tones), iv) 90 to 120 (31 tones), v) 121 to 151 (31 tones), vi) 152 to 181 (30 tones), vii) 182 to 211 (30 tones), viii) 212 to 241 (30 tones)). In this case, pilot tone indices may be {15, 45, 75, 105, 136, 166, 196, 226}.

Here, when 2 tones positioned at the center (indices of {120, 121}) are excluded, pilot tone indices may be {14, 44, 74, 104, 136, 166, 196, 226} or {15, 45, 75, 105, 137, 167, 197, 227}.

(2) Forty-Fourth Embodiment

In the present invention, pilot tones may be positioned at indices which have been corrected in consideration of pilot tone index spacing by excluding DC tones and guard tones from the pilot tone indices proposed in the first to seventh embodiments. For example, when the 242-tone resource unit includes 8 pilot tones, corrected pilot tone indices may be {19, 47, 83, 111, 130, 158, 194, 222}.

Further, in the present invention, pilot tones may be positioned at indices which have been corrected in consideration of pilot tone index spacing by excluding only guard tones from the pilot tone indices proposed in the first to seventh embodiments (or including only DC tones). When 8 pilot tones are present in legacy systems, the 8 pilot tones are positioned at {±11, ±39, ±75, ±103}, and thus pilot tone indices of {17, 45, 81, 109, 131, 159, 195, 223} or {18, 46, 82, 110, 132, 160, 196, 224} are derived in consideration of symmetry.

5. 484-Tone Resource Unit

It is assumed that subcarriers (or tones) included in a 484-tone resource unit sequentially have indices of 0 to 483. The number and values of pilot tones included in the 484-tone resource unit conform to the scheme proposed in the eighth to fourteenth embodiments. A description will be given on the basis of pilot tone indices included in the 484-tone resource unit.

(1) Forty-Fifth Embodiment

In the present embodiment, when the 484-tone resource unit is divided by the number of pilot tones, pilot tones may be positioned at the centers of divided parts. For example, when the 484-tone resource unit includes 16 pilot tones, the 484-tone resource unit may be divided into 16 parts and the 16 pilot tones may be positioned at the centers of the parts. If 2 tones are positioned at the center of each part because each part is composed of an even number of tones, a pilot tone may correspond to one of the 2 tones.

(2) Forty-Sixth Embodiment

In the present invention, pilot tones may be positioned at indices which have been corrected in consideration of pilot tone index spacing by excluding DC tones and guard tones from the pilot tone indices proposed in the eighth to fourteenth embodiments. For example, when the 484-tone resource unit includes 8 pilot tones, corrected pilot tone indices may be {38, 94, 166, 222, 261, 317, 389, 445}.

Further, in the present invention, pilot tones may be positioned at indices which have been corrected in consideration of pilot tone index spacing by excluding only guard tones from the pilot tone indices proposed in the eighth to fourteenth embodiments (or including only DC tones). When 8 pilot tones are present in legacy systems, the 8 pilot tones are positioned at {±22, ±78, ±150, ±206}, and thus pilot tone indices of {35, 91, 163, 219, 263, 319, 391, 447} or {36, 92, 164, 220, 264, 320, 392, 448} are derived in consideration of symmetry.

(3) Forty-Seventh Embodiment

In the present embodiment, the number of pilot tones is 16. Here, indices ({±25, ±53, ±89, ±117, ±139, ±167, ±203, ±231}) of the eighth embodiment are corrected to be adapted to 484 tones and used as pilot tone indices of the present embodiment. The corrected indices may be {13, 41, 77, 105, 127, 155, 191, 219, 264, 292, 328, 356, 378, 406, 442, 470}.

Pilot tones of the present embodiment may be positioned at indices which have been corrected in consideration of symmetry after excluding guard tones from the pilot tone indices proposed in the eighth embodiment (including DC tones). Corrected indices may be {10, 38, 74, 102, 124, 152, 188, 216, 266, 294, 330, 358, 380, 408, 444, 472} or {11, 39, 75, 103, 125, 153, 189, 217, 267, 295, 331, 359, 381, 409, 445, 473}.

Further, pilot tones of the present embodiment may be positioned at indices which have been corrected in consideration of symmetry after excluding 2 tones of both sides, i.e. a total of 4 tones, and dividing the remaining indices by 30 tones (2 to 31, 32 to 61, 62 to 91, 92 to 121, . . . , 452 to 481) in the pilot tone indices proposed in the eighth embodiment. In this case, pilot tone indices of {16, 46, 76, 106, 136, 166, 196, 226, 256, 286, 316, 346, 376, 406, 436, 466} or {17, 47, 77, 107, 137, 167, 197, 227, 257, 287, 317, 347, 377, 407, 437, 467} may be derived.

Further, pilot tones of the present embodiment may be positioned at indices which have been corrected by excluding 4 central tones and dividing the remaining indices by 30 tones in the pilot tone indices proposed in the eighth embodiment. In this case, pilot tone indices of {14, 44, 74, 104, 134, 164, 194, 224, 258, 288, 318, 348, 378, 408, 438, 468} or {15, 45, 75, 105, 135, 165, 195, 225, 259, 289, 319, 349, 379, 409, 439, 469} may be derived.

6. 996-Tone Resource Unit

It is assumed that subcarriers (or tones) included in a 996-tone resource unit sequentially have indices of 0 to 995. The number and values of pilot tones included in the 996-tone resource unit conform to the scheme proposed in the fifteenth to twenty-second embodiments. A description will be given on the basis of pilot tone indices included in the 996-tone resource unit.

(1) Forty-Eighth Embodiment

In the present embodiment, when the 996-tone resource unit is divided by the number of pilot tones, pilot tones may be positioned at the centers of divided parts. For example, when the 996-tone resource unit includes 16 pilot tones, the 484-tone resource unit may be divided into 16 parts and the 16 pilot tones may be positioned at the centers of the parts. If 2 tones are positioned at the center of each part because each part is composed of an even number of tones, a pilot tone may correspond to one of the 2 tones.

(2) Forty-Ninth Embodiment

In the present invention, pilot tones may be positioned at indices which have been corrected in consideration of pilot tone index spacing by excluding DC tones and guard tones from the pilot tone indices proposed in the fifteenth to twenty-second embodiments.

(3) Fifties Embodiment

Indices ({±50, ±106, ±178, ±234, ±278, ±334, ±406, ±462}) proposed in the seventeenth embodiment are corrected and used as indices of pilot tones of the present embodiments. The corrected indices may be {38, 94, 166, 222, 266, 322, 394, 450, 545, 601, 673, 729, 773, 829, 901, 957}.

Further, pilot tones of the present embodiment may be positioned at indices which have been corrected in consideration of pilot tone index spacing and symmetry after excluding only guard tones from the pilot tone indices proposed in the seventeenth embodiment (or including only DC tones). Corrected indices may be {35, 91, 163, 219, 263, 319, 391, 447, 547, 603, 675, 731, 775, 831, 903, 959} or {36, 92, 164, 220, 264, 320, 392, 448, 548, 604, 676, 732, 776, 832, 904, 960}.

Further, pilot tones of the present embodiment may be positioned at indices which have been corrected in consideration of symmetry after excluding 2 tones of both sides, a total of 4 tones, and dividing the remaining indices by 62 tones (2 to 63, 64 to 125, 126 to 187, 188 to 249, . . . , 932 to 993) in the pilot tone indices proposed in the seventeenth embodiment. In this case, pilot tone indices of {32, 94, 156, 218, 280, 342, 404, 466, 528, 590, 652, 714, 776, 838, 900, 962} or {33, 95, 157, 219, 281, 343, 405, 467, 529, 591, 653, 715, 777, 839, 901, 963} may be derived.

Further, pilot tones of the present embodiment may be positioned at indices which have been corrected by excluding central 4 tones and dividing the remaining indices by 62 tones (0 to 61, 62 to 123, . . . , 434 to 495, 500 to 561, . . . , 934 to 995) in the pilot tone indices proposed in the seventeenth embodiment. In this case, pilot tone indices of {30, 92, 154, 216, 278, 340, 402, 464, 530, 592, 654, 716, 778, 840, 902, 964} or {31, 93, 155, 217, 279, 341, 403, 465, 531, 593, 655, 717, 779, 841, 903, 965} may be derived.

Pilot tone plans proposed in non-OFDMA transmission schemes and OFDMA transmission schemes have been described. Hereinafter, a scheme of allocating different pilot tones to respective users in non-OFDMA transmission will be described.

C. Method of Allocating Pilot Tone Per STA

The 802.11ax system supports UL MU transmission. In this case, an AP receives mixed signals because multiple STAs (or users) simultaneously transmit signals. Here, although each STA compensates for a CFO prior to transmission of a signal to the AP and then transmits the signal, the CFO is not completely compensated for due to communication failure such as noise and a residual CFO remains. Accordingly, the AP may compensate for the residual CFO in order to achieve reliable performance. However, since STAs have different residual CFO values, the AP requires a new scheme for allocating a pilot tone per STA, different from the above-described schemes, to measure and compensate for a residual CFO using a pilot tone.

In the following embodiments, pilot tone plans proposed in non-OFDMA and OFDMA schemes may be basically applied. However, different pilot tones may be allocated to respective STAs, and each STA may set values of pilot tones other than a pilot tone allocated thereto to "0". FIG. 33 is a table showing pilot tone values allocated per STA according to an embodiment of the present invention.

1. Random Allocation

The number of pilot tones may be randomly allocated to each STA.

For example, a situation in which STA 1 and STA 2 perform UL MU transmission using one stream and a 20 MHz bandwidth is allocated thereto may be assumed. Here, the number and indices of pilot tones may conform to the scheme proposed in the first embodiment. In this case, second and fifth pilot tones may be randomly allocated to STA 1 and the remaining pilot tones may be allocated to STA 2. Here, pilot tone values may be determined as shown in FIG. 33(*a*). In FIG. 33(*a*), iSTS denotes a stream index and $\psi^{NSTS,8}_{iSTS,j}$ denotes a value of a pilot tone disposed at a j-th position from among 8 pilot tones in a stream having iSTS.

In the above embodiment, different numbers of pilot tones are allocated to the STAs and thus there may be a CFO tracking performance difference therebetween.

2. Even Allocation

The same number of pilot tones may be allocated to STAs.

When the same number of pilot tones is allocated to STAs, pilot tones may remain. For example, 8 pilot tones are allocated to STAs 1, 2 and 3 by 2, 2 pilot tones (=8−2*3)

may remain. Here, the remaining pilot tones may be randomly allocated to the STAs. Otherwise, all remaining pilot tones may be allocated to an STA having the highest or lowest SINR (Signal to Interference plus Noise Ratio). Otherwise, the remaining pilot tones may be allocated one by one to STAs from the STA having the highest SINR in descending order or from the STA having the lowest SINR in ascending order. When the remaining pilot tones are allocated to an STA having a high SINR, higher performance is guaranteed for an STA showing higher performance, improving average throughput. When the remaining pilot tones are allocated to an STA having a low SINR, performance of an STA having low performance is enhanced to satisfy QoS.

Indices (or positions) of pilot tones allocated to each STA may be set in various manners.

As an embodiment, the AP may sequentially allocate pilot tones to STAs from the leftmost or rightmost pilot tone. For example, it is assumed that 8 pilot tones are allocated to STAs 1 to 3. In this case, the leftmost first pilot tone may be allocated to STA 1, the second pilot tone disposed to the right of the first pilot tone may be allocated to STA 2, the third pilot tone disposed to the right of the second pilot tone may be allocated to STA 3, and the fourth pilot tone disposed to the right of the third pilot tone may be allocated to STA 1. Consequently, the first, fourth and seventh pilot tones are allocated to STA 1, the second, fifth and eighth pilot tones are allocated to STA 2 and the third and sixth pilot tones are allocated to STA 3.

As another embodiment, the AP may sequentially allocate pilot tones to STAs from the leftmost or rightmost pilot tones by the number of pilot tones allocated per STA.

For example, it is assumed that 3 pilot tones are allocated to STA 1, 3 pilot tones are allocated to STA 2 and 2 pilot tones are allocated to STA 3. In this case, the 8 pilot tones may be allocated from the leftmost (or rightmost) pilot tones in such a manner that 3, 3, and 2 pilot tones are sequentially respectively allocated to STAs 1 to 2. Consequently, first to third pilot tones are allocated to STA 1, the fourth to sixth pilot tones are allocated to STA 2 and the seventh and eighth pilot tones are allocated to STA 3. Here, the first pilot tone may refer to the leftmost or rightmost pilot tone from among pilot tones in the frequency band.

As another embodiment, a situation will be described in which STA 1 and STA 2 perform UL MU transmission using one stream and a 20 MHz bandwidth is allocated thereto. Here, the number, indices and values of pilot tones applied to the 20 MHz bandwidth may conform to the scheme proposed in the first embodiment. In this case, the first to fourth pilot tones from among the pilot tones of the 20 MHz bandwidth may be allocated to STA 1 and the fifth to eighth pilot tones may be allocated to STA 2 according to the above description. Here, values of the pilot tones allocated to each STA may be determined as shown in FIG. 33(*b*). In FIG. 33(*b*), iSTS indicates a stream index and $\psi^{NSTS,8}_{iSTS,j}$ indicates a value of a pilot tone at a j-th position from among 8 pilot tones in a stream having iSTS.

3. Differential Allocation

All pilot tones may be allocated to an STA having the highest or lowest SINR. Otherwise, numbers of pilot tones in proportion or inverse proportion to SINRs of STAs may be allocated to the STAs. Here, when the number of pilot tones calculated in proportion or inverse proportion to an SINR is not a natural number, the calculated number of pilot tones may be rounded off. For example, if the number of pilot tones that may be allocated to STAs is 8 and 1.6 pilot tones and 6.4 pilot tones are allocated to STA 1 and STA 2 depending on an SINR ratio thereof, 1.6 and 6.4 may be rounded off and thus 2 and 6 pilot tones may be respectively allocated to STA 1 and STA 2. If 2 pilot tones are allocated to STA 1 and 7 pilot tones are allocated to STA 2 since the numbers of pilot tones allocated to STA 1 and STA 2 are determined to be 1.5 and 6.5 depending on an SINR ratio, 1 is subtracted from the larger number of pilot tones. That is, 2 pilot tones are allocated to STA 1 and 6 pilot tones are allocated to STA 2.

When pilot tones in proportion to SINR are allocated, a larger number of pilot tones is allocated to an STA having higher performance to guarantee higher performance, improving average throughput. When pilot tones in inverse proportion to an SINR are allocated, the performance of an STA having low performance is improved to meet QoS.

Here, Indices (or positions) of pilot tones allocated to each STA may be set in various manners.

As an embodiment, the AP may sequentially allocate pilot tones to STAs from the leftmost or rightmost pilot tone. For example, it is assumed that 8 pilot tones are allocated to STAs 1 to 3. In this case, the leftmost first pilot tone may be allocated to STA 1, the second pilot tone disposed to the right of the first pilot tone may be allocated to STA 2, the third pilot tone disposed to the right of the second pilot tone may be allocated to STA 3, and the fourth pilot tone disposed to the right of the third pilot tone may be allocated to STA 1. Consequently, the first, fourth and seventh pilot tones are allocated to STA 1, the second, fifth and eighth pilot tones are allocated to STA 2 and the third and sixth pilot tones are allocated to STA 3.

As another embodiment, the AP may sequentially allocate pilot tones to STAs from the leftmost or rightmost pilot tones by the number of pilot tones allocated per STA.

For example, it is assumed that 3 pilot tones are allocated to STA 1, 3 pilot tones are allocated to STA 2 and 2 pilot tones are allocated to STA 3. In this case, the 8 pilot tones may be allocated from the leftmost (or rightmost) pilot tones in such a manner that 3, 3, and 2 pilot tones are sequentially respectively allocated to STAs 1, 2 and 3. Consequently, first to third pilot tones are allocated to STA 1, the fourth to sixth pilot tones are allocated to STA 2 and the seventh and eighth pilot tones are allocated to STA 3. Here, the first pilot tone may refer to the leftmost or rightmost pilot tone from among pilot tones in the frequency band.

As another embodiment, a situation will be described in which STA 1 and STA 2 perform UL MU transmission using one stream and a 20 MHz bandwidth is allocated thereto. Here, the number, indices and values of pilot tones applied to the 20 MHz bandwidth may conform to the scheme proposed in the first embodiment. The number of pilot tones allocated to each STA may be determined in proportion to an SINR ratio. When the SINR ratio of STA 1 to STA 2 is 1:4, 2 (rounding off 1.6) pilot tones are allocated to STA 1 and 6 pilot tones are allocated to STA 2. Here, the first and second pilot tones may be allocated to STA 1 and the fourth to eighth pilot tones may be sequentially allocated to STA 2 according to the above description. Accordingly, values of the pilot tones allocated to the STAs may be determined as shown in FIG. 33(*c*). In FIG. 33(*c*), iSTS indicates a stream index and $\psi^{NSTS,8}_{iSTS,j}$ indicates a value of a pilot tone at a j-th position from among 8 pilot tones in a stream having iSTS.

When there is a large number of STAs that need to be allocated pilot tones in a situation where the number of pilot tones is limited, the number of pilot tones that may be allocated to each STA decreases when the above-described embodiment is applied, remarkably deteriorating CFO estimation performance. Accordingly, a method of grouping STAs and allocating pilot tones to each group is proposed to increase the number of pilot tones allocated to each STA.

Here, STAs may be grouped according to the following embodiment.

1) A maximum number NU_max of STAs that may belong to one group and an alpha value that is a channel orthogonality threshold (0 to 1: orthogonality increases as the alpha value decreases) are set.

2) STAs are sorted in descending order of SINR.

3) Correlation values between a channel of an STA having the highest SINR and channels of other STAs are obtained and the maximum number NU_max of STAs from an STA having the smallest correlation value from among STAs having correlation values less than the alpha value are grouped.

4) Steps 1) to 3) are sequentially performed for ungrouped STAs from an STA having the highest SINR until all STAs are grouped. Here, one group may include one STA.

STAs belonging to each group use pilot tones allocated to each group. For example, STA 1 and STA 2 may belong to a first group and 4 pilot tones may be allocated to the first group. In this case, STA 1 and STA 2 may use the 4 pilot tones allocated to the first group. Here, the method of allocating pilot tones per group may be applied by replacing an STA by a group in the above-described embodiments. In this case, the average SINR of STAs in a group may be used as an SINR.

FIG. 34 is a flowchart illustrating a data transmission method of an STA device according to an embodiment of the present invention. The above-described embodiments may be equally applied in relation to the flowchart. Accordingly, redundant description will be omitted hereinafter.

Referring to FIG. 34, an STA may generate a PPDU (S3401). Here, the generated PPDU includes a physical preamble and a data field.

Then, the STA may transmit the generated PPDU (S3402). Here, the data filed may be transmitted using a 106-tone resource unit including first to fourth pilot tones. Here, the positions of the first to fourth pilot tones may correspond to positions of 4 pilot tones from among 8 pilot tones included in 4 26-tone resource units at positions corresponding to the 106-tone resource unit. Otherwise, the positions of the first to fourth pilot tones may correspond to positions of 4 pilot tones from among 8 pilot tones included in 2 26-tone resource units at positions corresponding to the 106-tone resource unit. This has been described above with reference to FIG. 32 in the fortieth embodiment and thus redundant description is omitted.

FIG. 35 is a block diagram of each STA device according to an embodiment of the present invention.

In FIG. 35, an STA device 3510 may include a memory 3512, a processor 3511 and an RF unit 3513. And, as described above, the STA device may be an AP or a non-AP STA as an HE STA device.

The RF unit 3513 may transmit/receive a radio signal with being connected to the processor 3511. The RF unit 3513 may transmit a signal by up-converting the data received from the processor 3511 to the transmission/reception band.

The processor 3511 may implement the physical layer and/or the MAC layer according to the IEEE 802.11 system with being connected to the RF unit 4013. The processor 3511 may be constructed to perform the operation according to the various embodiments of the present invention according to the drawings and description. In addition, the module for implementing the operation of the STA 3510 according to the various embodiments of the present invention described above may be stored in the memory 3512 and executed by the processor 3511.

The memory 3512 is connected to the processor 3511, and stores various types of information for executing the processor 3511. The memory 3512 may be included interior of the processor 3511 or installed exterior of the processor 3511, and may be connected with the processor 3511 by a well known means.

In addition, the STA device 3510 may include a single antenna or a multiple antenna.

The detailed construction of the STA device 3510 of FIG. 35 may be implemented such that the description of the various embodiments of the present invention is independently applied or two or more embodiments are simultaneously applied.

Although the description of the present invention is explained with reference to each of the accompanying drawings for clarity, it is possible to design new embodiments by merging the embodiments shown in the accompanying drawings with each other. Further, a display device may be non-limited by the configurations and methods of the embodiments mentioned in the foregoing description. The embodiments mentioned in the foregoing description may be configured in a manner of being selectively combined with one another entirely or in part to enable various modifications.

It will be appreciated by those skilled in the art that various modifications and variations may be made in the present invention without departing from the spirit or scope of the invention. Thus, it is intended that the present invention cover the modifications and variations of this invention provided they come within the scope of the appended claims and their equivalents.

MODE FOR INVENTION

Various embodiments have been described in the best mode for carrying out the invention.

INDUSTRIAL APPLICABILITY

While the data transmission and reception methods in a wireless communication system according to the present invention have been described on the basis of examples in which the methods are applied to IEEE 802.11, the methods are applicable to various wireless communication systems in addition to IEEE 802.11.

What is claimed is:

1. A data transmission method of a station (STA) in a wireless local area network (WLAN) system, the method comprising:
  generating a physical protocol data unit (PPDU) including a physical preamble and a data field; and
  transmitting the PPDU,
  based on the data field being transmitted within a bandwidth including a 106-tone resource unit including first to fourth pilot tones,
  wherein locations of the first to fourth pilot tones correspond to locations of pilot tones of a 26-tone resource unit,
  wherein the first pilot tone and the second pilot tone are located at locations corresponding to index 5 or 6 based on indexes of the 26-tone resource unit being 0 to 25, and
  wherein the third pilot tone and the fourth pilot tone are located symmetric to the location of the first pilot tone and the location of the second pilot tone.

2. The method of claim 1,
wherein a first pilot sequence {1 1 1 −1} is applied to the first to fourth pilot tones.

3. The method of claim 1,
based on the first pilot tone and the second pilot tone being located at locations corresponding to the index 5 and indexes of the 106-tone resource unit being 0 to 105,
wherein the location of the first pilot tone is index 5 of the 106-tone resource unit, and
wherein the location of the second pilot tone is index 31 of the 106-tone resource unit.

4. The method of claim 3,
wherein the location of the third pilot tone is index 73 of the 106-tone resource unit, and
wherein the location of the fourth pilot tone is index 99 of the 106-tone resource unit.

5. The method of claim 1,
based on the first pilot tone and the second pilot tone being located at locations corresponding to the index 6 and indexes of the 106-tone resource unit being 0 to 105,
wherein the location of the first pilot tone is index 6 of the 106-tone resource unit, and
wherein the location of the second pilot tone is index 32 of the 106-tone resource unit.

6. The method of claim 5,
wherein the location of the third pilot tone is index 74 of the 106-tone resource unit, and
wherein the location of the fourth pilot tone is index 100 of the 106-tone resource unit.

7. The method of claim 1,
based on the data field being transmitted within a bandwidth including a 996-tone resource unit including first to sixteenth pilot tones,
wherein a second pilot sequence {1 1 1 −1 −1 1 1 1 1 1 −1 −1 1 1 1} is applied to the first to sixteenth pilot tones.

8. A station (STA) in a wireless local area network (WLAN) system, the STA comprising:
a transceiver configured to transmit and receive a wireless signal; and
a processor configured to control the transceiver,
wherein the processor is further configured to:
generate a physical protocol data unit (PPDU) including a physical preamble and a data field; and
transmit the PPDU,
based on the data field being transmitted within a bandwidth including a 106-tone resource unit including first to fourth pilot tones,
wherein locations of the first to fourth pilot tones correspond to locations of pilot tones of a 26-tone resource unit,
wherein the first pilot tone and the second pilot tone are located at locations corresponding to index 4 or 5 based on indexes of the 26-tone resource unit being 0 to 25, and
wherein the third pilot tone and the fourth pilot tone are located symmetric to the location of the first pilot tone and the location of the second pilot tone.

9. The STA of claim 8,
wherein a first pilot sequence {1 1 1 −1} is applied to the first to fourth pilot tones.

10. The STA of claim 8,
based on the first pilot tone and the second pilot tone being located at locations corresponding to the index 4,
wherein the location of the first pilot tone is index 6 of the 106-tone resource unit, and
wherein the location of the second pilot tone is index 32 of the 106-tone resource unit.

11. The STA of claim 10,
wherein the location of the third pilot tone is index 74 of the 106-tone resource unit, and
wherein the location of the fourth pilot tone is index 100 of the 106-tone resource unit.

12. The STA of claim 8,
based on the first pilot tone and the second pilot tone being located at locations corresponding to the index 5,
wherein the location of the first pilot tone is index 5 of the 106-tone resource unit, and
wherein the location of the second pilot tone is index 31 of the 106-tone resource unit.

13. The STA of claim 12,
wherein the location of the third pilot tone is index 73 of the 106-tone resource unit, and
wherein the location of the fourth pilot tone is index 99 of the 106-tone resource unit.

14. The STA of claim 8,
based on the data field being transmitted within a bandwidth including a 996-tone resource unit including first to sixteenth pilot tones,
wherein a second pilot sequence {1 1 1 −1 −1 1 1 1 1 1 −1 −1 1 1 1} is applied to the first to sixteenth pilot tones.

* * * * *